US012739891B2

(12) United States Patent
Rajendran et al.

(10) Patent No.: US 12,739,891 B2
(45) Date of Patent: Sep. 15, 2026

(54) PRE-SCHEDULING SCHEDULED RESOURCE BLOCKS (SRB) TO USER EQUIPMENT (UE) TO IMPROVE LATENCY AND USER EXPERIENCE

(71) Applicant: DISH Wireless L.L.C., Englewood, CO (US)

(72) Inventors: Karupaiah Rajendran, Sachse, TX (US); Norberto Amaya Gonzalez, San Diego, CA (US)

(73) Assignee: DISH Wireless L.L.C., Englewood, CO (US)

( * ) Notice: Subject to any disclaimer, the term of this patent is extended or adjusted under 35 U.S.C. 154(b) by 225 days.

(21) Appl. No.: 18/637,347

(22) Filed: Apr. 16, 2024

(65) Prior Publication Data

US 2025/0324459 A1 Oct. 16, 2025

(51) Int. Cl.

*H04W 76/20* (2018.01)
*H04B 17/318* (2015.01)
*H04W 72/1268* (2023.01)
*H04W 74/0833* (2024.01)

(52) U.S. Cl.

CPC ...... *H04W 74/0833* (2013.01); *H04B 17/328* (2023.05); *H04W 72/1268* (2013.01); *H04W 76/20* (2018.02)

(58) Field of Classification Search

CPC ............................... H04W 76/20; H04L 12/28
USPC ................................. 370/329, 401, 402, 403
See application file for complete search history.

(56) References Cited

U.S. PATENT DOCUMENTS

2020/0259896 A1* 8/2020 Sachs .................. H04L 63/0428
2025/0321320 A1* 10/2025 Jeon ........................ G01S 7/021

* cited by examiner

*Primary Examiner* — Dang T Ton
(74) *Attorney, Agent, or Firm* — Lowenstein Sandler LLP

(57) ABSTRACT

Technologies for providing pre-scheduling resources to UE in a cellular network to improve latency and user experience are described. The method receives, from a user equipment (UE), a first message including a random access channel (RACH) preamble. The method sends, to the UE, a second message comprising a random access response (RAR) with a first grant for the UE to send a third message. The method receives, from the UE, the third message including a radio resource control (RRC) message associated with the first grant. The method determines, using one or more parameters indicative of a latency for scheduling resource blocks by the node, that one or more scheduled resource blocks (SRBs) be pre-allocated to the UE before receiving a scheduling request (SR) from the UE. The method sends, to the UE, a fourth message comprising a second grant identifying the one or more SRBs pre-allocated to the UE.

20 Claims, 17 Drawing Sheets

RECEIVE, FROM A USER EQUIPMENT (UE), A FIRST MESSAGE COMPRISING A RANDOM ACCESS CHANNEL (RACH) PREAMBLE 502

SEND, TO THE UE, A SECOND MESSAGE COMPRISING A RANDOM ACCESS RESPONSE (RAR) WITH A FIRST GRANT FOR THE UE TO SEND A THIRD MESSAGE 504

RECEIVE, FROM THE UE, THE THIRD MESSAGE COMPRISING A RADIO RESOURCE CONTROL (RRC) MESSAGE ASSOCIATED WITH THE FIRST GRANT 506

DETERMINE, USING ONE OR MORE PARAMETERS INDICATIVE OF A LATENCY FOR SCHEDULING RESOURCE BLOCKS BY THE NODE, THAT ONE OR MORE SCHEDULED RESOURCE BLOCKS (SRBS) BE PRE-ALLOCATED TO THE UE BEFORE RECEIVING A SCHEDULING REQUEST (SR) FROM THE UE 508

SEND, TO THE UE, A FOURTH MESSAGE COMPRISING A SECOND GRANT IDENTIFYING THE ONE OR MORE SRBS PRE-ALLOCATED TO THE UE 510

RECEIVE, FROM A USER EQUIPMENT (UE), A FIRST MESSAGE COMPRISING A RANDOM ACCESS CHANNEL (RACH) PREAMBLE 502

SEND, TO THE UE, A SECOND MESSAGE COMPRISING A RANDOM ACCESS RESPONSE (RAR) WITH A FIRST GRANT FOR THE UE TO SEND A THIRD MESSAGE 504

RECEIVE, FROM THE UE, THE THIRD MESSAGE COMPRISING A RADIO RESOURCE CONTROL (RRC) MESSAGE ASSOCIATED WITH THE FIRST GRANT 506

DETERMINE, USING ONE OR MORE PARAMETERS INDICATIVE OF A LATENCY FOR SCHEDULING RESOURCE BLOCKS BY THE NODE, THAT ONE OR MORE SCHEDULED RESOURCE BLOCKS (SRBS) BE PRE-ALLOCATED TO THE UE BEFORE RECEIVING A SCHEDULING REQUEST (SR) FROM THE UE 508

SEND, TO THE UE, A FOURTH MESSAGE COMPRISING A SECOND GRANT IDENTIFYING THE ONE OR MORE SRBS PRE-ALLOCATED TO THE UE 510

PRE-SCHEDULING SCHEDULED RESOURCE BLOCKS (SRB) TO USER EQUIPMENT (UE) TO IMPROVE LATENCY AND USER EXPERIENCE

BACKGROUND

Telecommunication networks, such as cellular networks, use a Random Access Channel (RACH) to enable user equipments (UEs) to initiate communication with the cellular network, particularly with a 5G NodeB (gNB), which is a Base Station in a Fifth generation (5G) wireless network (referred to as "5G network"). The RACH process is essential for various scenarios, including initial network entry, uplink synchronization, and when a device needs to request uplink resources for data transmission. RACH can be used by UEs to establish their initial connection with a gNB when they have data to send or when initially turning on within the network coverage area. RACH can also be used for resource requests. RACH allows UEs to request resources for uplink data transmission, particularly when the UE has not been active for some time and does not have scheduled resources.

In general, RACH procedures in 5G involve several steps, starting with the UE sending a preamble (Msg1) (also referred to as RACH preamble), followed by the network's response with a Random Access Response (RAR, Msg2). The UE then sends a connection request or initial message (Msg3), and the process concludes with a contention resolution message from the network (Msg4). This procedure ensures that the UE is synchronized with the network and has the necessary resources for communication. For UEs at the edge of coverage areas or in challenging environments, 5G new radio (NR) includes features to enhance RACH performance, such as increased preamble power and repetition techniques.

The RACH mechanism in 5G NR has evolved from its counterpart in LTE (4G). While the basic principles remain similar, 5G RACH has been optimized for greater efficiency, lower latency, and to support a massive number of devices, reflecting the diverse and demanding requirements of the 5G era. This includes enhancements for better handling of contention, improved procedures for devices with limited power or in poor coverage, and the flexibility to support a wide variety of use cases, including massive machine-type communications (mMTC) and ultra-reliable low-latency communications (URLLC). 5G UE may communicate over both a lower frequency Sub-6 GHz band between 410 MHz and 7125 MHz and a higher frequency mm Wave band between 24.25 GHZ and 52.6 GHz. The design of RACH in 5G supports a wide range of use cases, from IoT devices with sporadic data transmission needs to high-performance applications requiring rapid access and low latency.

BRIEF DESCRIPTION OF THE DRAWINGS

The present disclosure is illustrated by way of example, and not by way of limitation, in the figures of the accompanying drawings. To easily identify the discussion of any particular element or act, the most significant digit or digits in a reference number refer to the figure number in which that element is first introduced.

FIG. 5 is a flow diagram of a method for prescheduling resource blocks according to at least one embodiment.

FIG. 7A-FIG. 7D depict various embodiments of a radio access network.

DETAILED DESCRIPTION

Figure 1:
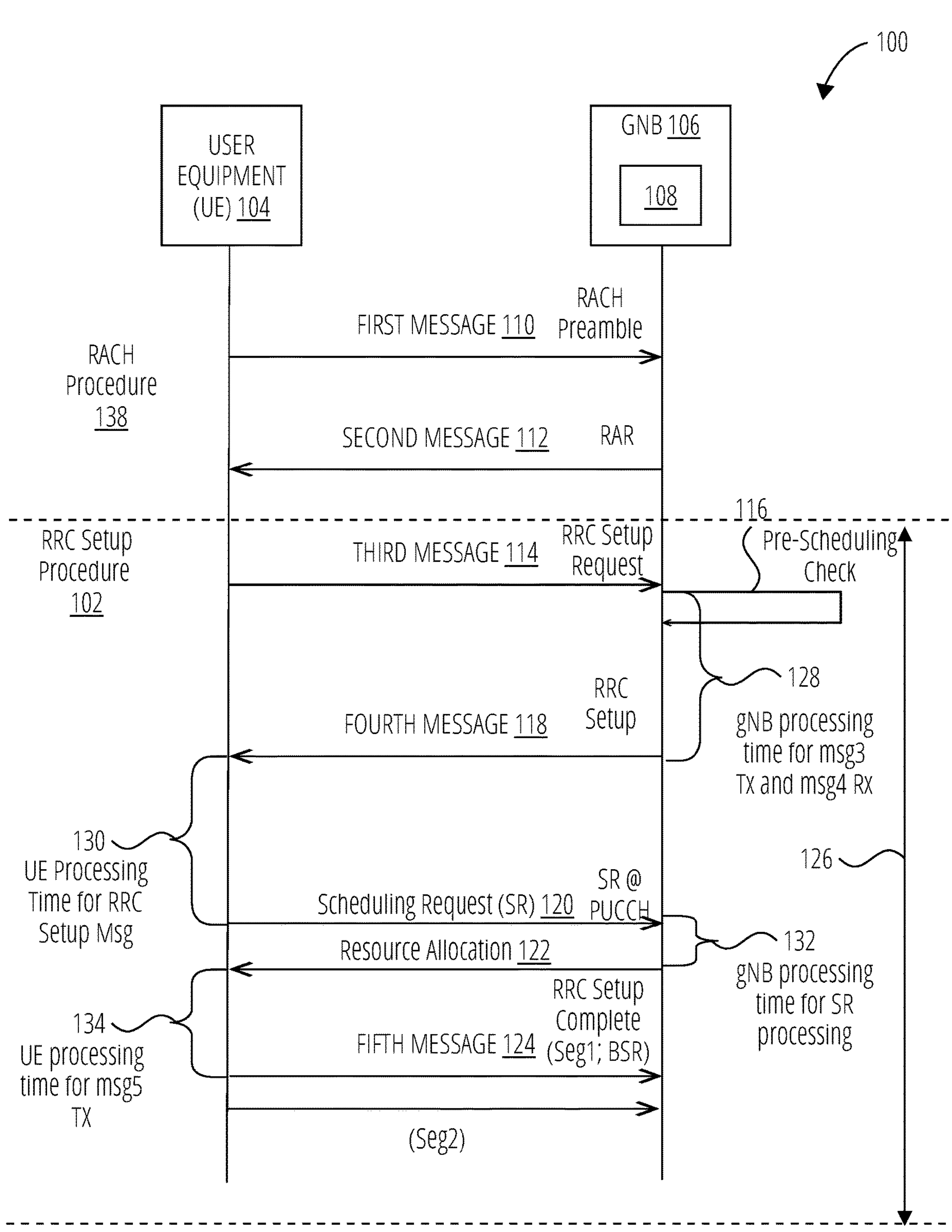
FIG. 1 is a sequence diagram of a process for scheduling resource blocks in an RRC setup procedure without pre-scheduling enabled according to at least one embodiment.

Technologies for providing pre-scheduling resources to UE in a cellular network (e.g., 5G wireless network, 6G wireless network) to improve latency and user experience are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

In 5G networks, the scheduling of Resource Blocks (RBs) is a key function performed by the Base Station (gNB) to efficiently allocate the limited radio resources among multiple UEs while ensuring quality of service, fairness, and adherence to service requirements. Resource Blocks (RB) (also referred to as scheduled resource blocks (SRBs)) are the smallest units of radio resources that can be allocated to a user for data transmission. The gNB schedules SRBs both in the downlink (DL) direction, from the Base Station to the user devices, and in the uplink (UL) direction, from the user devices to the Base Station. The scheduling decisions are based on various factors, including the Quality of Service (QOS) requirements, channel conditions, and available resources. 5G employs a dynamic scheduling mechanism, where the gNB frequently updates the allocation of SRBs based on real-time information. This approach allows the network to adapt to changing conditions and demands, optimizing resource utilization and user experience.

Scheduling in 5G faces challenges such as the need to balance conflicting requirements (e.g., throughput vs.

latency), managing interference, especially in dense deployments, and adapting to heterogeneous network environments. Advanced algorithms, machine learning techniques, and continuous feedback mechanisms are utilized to address these challenges, enabling dynamic and efficient resource allocation.

One aspect of scheduling SRBs to a UE in a cellular network is the latency caused by the gNB and the UE to process exchanged messages, such as radio resource control (RRC) messages. In particular, a latency can be made up of a processing time for the gNB to process an RRC request (Msg3) and send an RRC response (Msg4), a processing time for the UE to process the RRC response (Msg4) and send a schedule request (SR) to the gNB, a processing time for the gNB to process the SR and send a resource allocation, and a processing time for the UE to process the resource allocation and send an RRC complete message (Msg5). The processing times add to the overall latency for scheduling SRBs for the UE. The processing time for scheduling SRBs can also degrade user experience.

Aspects and embodiments of the present disclosure address the above and other deficiencies by providing pre-scheduling logic that provides pre-scheduling of resources to a UE in a cellular network (e.g., 5G wireless network, 6G wireless network). Aspects and embodiments of the present disclosure can provide improved latency and user experience.

FIG. 1 is a sequence diagram of a process 100 for scheduling resource blocks in an RRC setup procedure 136 without pre-scheduling enabled according to at least one embodiment. The process 100 involves operations performed by a UE 104 and a 5G radio Base Station (labeled gNB 106), referred to as generation Node B, a "gNodeB," or "gNB." The gNB 106 is a network element that is responsible for the transmission and reception of radio signals in one or more cells to or from user equipment, such as UE 104. In one embodiment, the UE 104 can include an electronic device with wireless connectivity or cellular communication capability, such as a mobile phone or handheld computing device. In at least one example, the UE 104 can include a 5G smartphone or a 5G cellular device that connects to the pre-scheduling logic 108 via a wireless connection. The UE 104 can be one of a number of UEs (not depicted in FIG. 1) that are in communication with the gNB 106. The UEs may include mobile and non-mobile computing devices. The UEs may include laptop computers, desktop computers, an Internet-of-Things (IoT) devices, and/or any other electronic computing device that includes a wireless communications interface to access a radio access network (RAN), including the gNB 106. The RAN can include a remote radio unit (RRU) for wirelessly communicating with UE 608. The RRU can include a Radio Unit (RU) and may include one or more radio transceivers for wirelessly communicating with UE 104. The RRU may include circuitry for converting signals sent to and from an antenna of the gNB 106 into digital signals for transmission over packet networks.

As part of the process 100, pre-scheduling logic 108 of gNB 106 can determine whether to enable pre-scheduling of resource blocks or disable pre-scheduling resource blocks. The pre-scheduling logic 108 can be processing logic that may comprise hardware (e.g., circuitry, dedicated logic, programmable logic, microcode, etc.), software (e.g., instructions run on a processing device to perform hardware simulation), or a combination thereof. A Resource Block (RB) (also referred to as scheduled resource block (SRB)) can include a number of subcarriers in the frequency domain (e.g., 12 subcarriers in 5G), with a variable time duration depending on the numerology (subcarrier spacing) used in the specific 5G New Radio (NR) deployment. The numerologies in 5G NR allow for different subcarrier spacings to support various use cases, such as enhanced Mobile Broadband (cMBB), Ultra-Reliable Low-Latency Communications (URLLC), and massive Machine Type Communications (mMTC).

Processes can be used for scheduling RBs both in the downlink (DL) direction, from the base station to the user devices, and in the uplink (UL) direction, from the user devices to the base station. In at least one embodiment, as illustrated in the process 100 of FIG. 1, the gNB 106 schedules RBs in the uplink (UL) direction, from the UE 104 to the gNB 106. The scheduling decisions are based on various factors, including the Quality of Service (QOS) requirements, channel conditions, and available resources. In at least one embodiment, the gNB 106 employs a dynamic scheduling mechanism, where the gNB 106 frequently updates the allocation of RBs based on real-time information. This approach allows the cellular network to adapt to changing conditions and demands, optimizing resource utilization and user experience. The gNB 106 can employ advanced antenna technologies, such as Massive MIMO (Multiple Input Multiple Output) and beamforming to allow the cellular network to focus energy towards specific users, enhancing signal quality and enabling more efficient use of RBs. The gNB 106 can include a scheduler that works in conjunction with these technologies to optimize the allocation of resources spatially, in addition to frequency and time. The scheduler can use flexible numerology to allocate RBs with different subcarrier spacings and time durations, catering to the specific needs of different applications. For example, applications requiring low latency can be allocated RBs with shorter Transmission Time Intervals (TTIs), enabling quicker transmission and response times. The scheduler can consider factors from the physical layer up to the application layer to enable the schedule to make informed decisions that optimize network performance and user experience.

As illustrated in FIG. 1, the process 100 involves several steps, starting with the UE 104 sending a first message 110 (RACH preamble or Msg1). The first message 110 can be sent on the physical random access channel (PRACH). The first message 110 can be an initial message to notify the gNB 106 of the UE's intention to establish a connection. The first message 110 can be sent by the UE 104 after power up, transitioning from airplane mode, or other initialization conditions. In at least one embodiment, the preamble can be selected from a finite set, and its selection can be random or based on specific criteria set by the network.

Upon receiving the first message 110, the gNB 106 responds by sending a second message 112 (RAR, Msg2) on the downlink. The second message 112 can include a temporary identifier (TC-RNTI), timing advance command (for adjusting the UE's transmission timing), and uplink resource grants for the UE 104 to send the next message. The RAR can also include the selected preamble, allowing the UE 104 to identify that the RAR is intended for it. In particular, the second message 112 can include a first grant that specifies one or more resources for sending a third message, such as a setup request, a reconfiguration request, or the like. The first message 110 and second message 112 can be an initial random access procedure or a RACH procedure 138.

In some cases, a third message (Msg3) and a fourth message (Msg4) are used as part of the RACH procedure 138. For example, using the resources granted in the first grant in the second message 112 (RAR), the UE 104 sends a third message (RACH message 3 (Msg3). The UE 104 can send the third message on a Physical Uplink Shared Channel (PUSCH). The third message usually contains the UE's identity (if not already known to the network) and any necessary control information. The final message (Msg4) in the RACH procedure 138, can be sent by the gNB 106 on the downlink, and is used to confirm the UE's identity and to finalize the random access process. This message indicates that the network has successfully processed the UE's initial request and provides necessary information for the UE to proceed with the network access. This step also resolves any contention that might have occurred if multiple UEs selected the same preamble. The RACH procedure 138 in 5G NR is designed to be efficient and support a wide range of use cases, including those requiring low latency or involving a large number of IoT devices. The process allows for dynamic adjustment and optimization to accommodate various network conditions and UE demands.

In other cases, such as illustrated in FIG. 1, for initial access, using the resources granted in the first grant in the second message 112 (RAR), the UE 104 sends a third message with a connection setup request (RRC Setup Request, Msg 3). The RRC setup request can be part of an RRC protocol, which is responsible for configuration, management, and release of radio resources between the UE 104 and the network. The RRC setup request is a step in the process of establishing a connection between the UE 104 and the network, specifically with its gNB 106. The RRC setup request is initiated by the UE 104 as part of the process 100 to transition from an idle state to a connected state, enabling it to access network services and exchange data. The RRC setup request is typically initiated after the UE 104 has successfully completed the initial random access procedure or RACH procedure 138. Once the UE 104 has established a preliminary connection with the network through the RACH procedure 138, the UE 104 sends an RRC setup request (in third message 114) to request the establishment of an RRC connection. The RRC setup request message includes information necessary for the network to establish the RRC connection. This information might encompass the UE's identity (if not already known to the network from previous interactions), supported radio capabilities, and any specific services or QoS requirements it is requesting. The primary purpose of the RRC setup request is to transition the UE from an idle state, where it has minimal interaction with the network and is not continuously monitored, to a connected state, where it can be managed by the network, receive and send data, and be actively involved in mobility management procedures.

In response to the RRC setup request in the third message 114, the pre-scheduling logic 108 can perform a pre-scheduling check 116 to determine whether pre-scheduling of resource blocks is enabled in the gNB 106. If pre-scheduling of resource blocks is enabled, one or more scheduled resource blocks (SRBs) can be pre-allocated to the UE 104 before receiving a scheduling request (SR) from the UE 104 for these resources. The pre-scheduling logic 108 can determine whether to enable pre-scheduling using one or more parameters. The one or more parameters can be indicative of a latency for scheduling resource blocks by the gNB 106. In at least one embodiment, the one or more parameters can include, a first parameter representing a cell level load of the gNB 106, a number of UEs connected to the gNB 106, a second parameter representing an amount of processing time for the gNB 106 to process the RRC setup request, a third parameter representing a traffic demand of the node, or the like. The traffic demand can also be referred to as a congestion metric, a traffic channel load, or other metrics. The one or more parameters can also include data demand associated with the gNB 106, a number of UEs connected to the gNB 106, a key performance indicator (KPI) or a state of an infrastructure resource of the cellular network, or a KPI or a state of the UE 104 connected to the gNB 106. The infrastructure resource can be a dedicated transport resource, a dedicated radio frequency (RF) resource instance, customer radio access network (RAN) data, a transport slice pipeline, secure signaling session data, a Radio Unit (RU), a radio access network (RAN) resource, or another service in the cellular network.

In response to the RRC setup request in the third message 114 and a determination that the pre-scheduling is not enabled by the pre-scheduling logic 108, the gNB 106 sends an RRC setup message in a fourth message 118 to the UE 104. The fourth message 118 contains the necessary configuration details for the UE 104, including radio bearer settings, security configurations, and any other relevant parameters that the UE needs to communicate effectively with the gNB 106. As part of the RRC setup procedure 136, the UE 104 sends a scheduling request (SR) 120 to the gNB 106 on the physical uplink control channel (PUCCH). In response to receiving the SR 120 on the PUCCH, the gNB 106 allocates one or more SRBs to the UE 104 and sends a resource allocation 122 identifying the one or more SRBs allocated to the UE 104.

Upon successful completion of the RRC setup procedure 136, the UE 104 can send a fifth message 124 with an RRC setup complete message to the gNB 106. The fifth message 124 can specify that the fifth message 124 is a first segment and include buffer status report (Seg1; BSR). Upon successful completion of the RRC setup procedure 136, the UE 104 can enter the RRC_CONNECTED state. In this state, the UE 104 has an established RRC connection, allowing for efficient use of radio resources, enhanced mobility management, and the ability to engage in data transmission and reception. The RRC setup request, as part of the overall 5G network operation, facilitates the dynamic management of network resources, supports the implementation of various 5G services with different QoS requirements, and enables efficient mobility and connectivity management. Given the diverse range of applications and services envisioned for 5G, from cMBB (enhanced Mobile Broadband) to URLLC (Ultra-Reliable Low-Latency Communications) and mMTC (massive Machine Type Communications), the ability to efficiently manage and transition UEs between different states is vital for achieving the performance goals of 5G networks. The RRC setup procedure 136 can ensure that the UE 104 is synchronized with the network and has the necessary resources for communication. For UEs at the edge of coverage areas or in challenging environments, 5G NR includes features to enhance RACH performance, such as increased preamble power and repetition techniques.

As described above, scheduling SRBs to a UE can involve various operations by the UE 104 and the gNB 106 in the exchanges of messages, such as RRC messages, that contribute to an overall latency for SRB scheduling. In particular, as illustrated in FIG. 1, an SRB scheduling latency 126 can be a first amount of time that is made up of a gNB processing time 128 for the gNB 106 to process the third message 114 and send an RRC setup message in the fourth message 118 to the UE 104, a UE processing time 130 for the UE 104 to process the RRC setup message and send the SR 120 to the gNB 106 on the PUCCH, a gNB processing time 132 for the gNB 106 to process the SR 120 and send a resource allocation response 122 to the SR 120, and a UE processing time 134 for the UE 104 to send an RRC setup complete message in the fifth message 124 to the gNB 106. As described above, the SRB scheduling latency 126 can contribute to a degradation to the user experience by UE 104 if too large.

TABLE 1 shows an example of latency between a RRC Setup message and an RRC Setup Complete message:

TABLE 1

| Index | Time | Code | Message | Details: |
|---|---|---|---|---|
| . . . | | | | |
| 373847 | 2024 Feb. 20 13:33:25.077286 | DL-CCH [5gNR] | __rrcSetup | physical__cell__id: 225 frequency: 129370 Slot__N: 0x0000 (0) sub__fn: 0x0006(6) sfn: 0x 012c (300) Slot__N: 0x0000(0) |
| . . . | | | | |
| 373849 | 2024 Feb. 20 13:33:25.084325 | Qc: 5G-NR[Chipset] | __[0xB89B] NR5G MAC UCI information | fn__sfn__slot slot: 0 Numerology: 0 frame: 301 uci__info[0] Common channel: (PUCCH__FMT0) (0) start__symbol: 12 carrier id: 0 num__symbols: 2 uci__request__bitmask ACK__NACK (0x01) num__harq: 1 num__sr: 0 num__csf: 0 total__harq__ack__bits: 1 |
| . . . | | | | |
| 373864 | 2024 Feb. 20 13:33:25.091865 | UL-DCCH [5gNR] | __rrcSetupComplete | slot: 0 scs: 0 sys__fn: 302 num dci: 1 dci[0] carrier id: 0 rnti__type: C__RNTI (0) dci__format: UL__0__0 (0) agg__level: LEVEL__4 (2) is__raw__dci: 1 raw__dci[2]: 0 x 00000000 raw__dci[1]: 0 x 00000000 raw__dci[0]: 0 x 0 6801812 dci format: UL__0__0 (0) |

As shown in TABLE 1, the RRC setup message is sent on the DL_CCCH and system frame 300, subframe 6 (i.e., RRC Setup (DL CCH): SFN:300/SF=6). The RRC setup complete message is sent on the UL_DCCH on the system frame 302, subframe 0 (i.e., RRC Setup Complete (UL DCCH): SFN: 302/SF=0). The latency between these two messages is approximately 14.5 milliseconds.

Even though the pre-scheduling logic 108 determined in the pre-scheduling check 116 that pre-scheduling was not enabled, the pre-scheduling logic 108 can reduce the overall latency for SRB scheduling when pre-scheduling is enabled because it can be determined that one or more resource blocks can be pre-allocated to the UE 104 before receiving an SR from the UE 104 for these resources, as described in more detail below with respect to FIG. 2. In particular, the pre-scheduling logic 108 can determine if SRBs can be pre-allocated to the UE 104 and provide an early grant that identifies the pre-allocated SRBs to the UE 104, effectively eliminating the gNB processing time 128, the UE processing time 130, the gNB processing time 132, and UE processing time 134. The overall latency when pre-scheduling is enabled in SRB scheduling can include a processing time for the gNB 106 to process the third message 114 and sending a fourth message to the UE 104 with a second grant identifying the pre-allocated SRBs, as described in more detail below with respect to FIG. 2.

Figure 2:
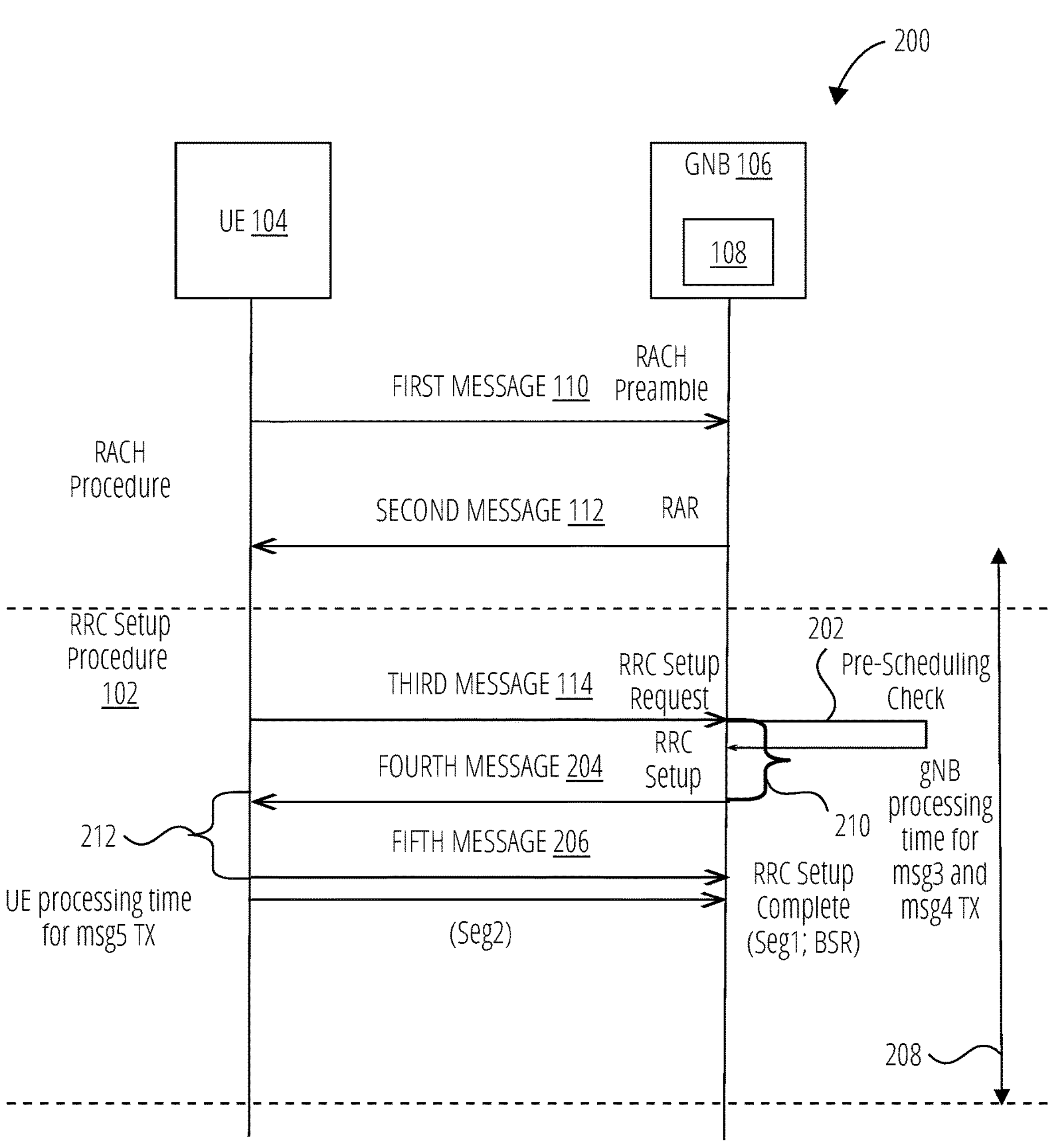
FIG. 2 is a sequence diagram of a process for scheduling resource blocks in an RRC setup procedure with pre-scheduling enabled according to at least one embodiment.

FIG. 2 is a sequence diagram of a process 200 for scheduling resource blocks with pre-scheduling according to at least one embodiment. The process 200 involves similar operations performed by the UE 104 and gNB 106 in the process 100 of FIG. 1, as noted by similar reference numbers. In this embodiment, the pre-scheduling logic 108 performs a pre-scheduling check 202 and determines that pre-scheduling is enabled. As described above, if pre-scheduling of resource blocks is enabled, one or more SRBs can be pre-allocated to the UE 104 before receiving a scheduling request (SR) from the UE 104 for these resources. The pre-scheduling logic 108 can determine whether to enable pre-scheduling using one or more parameters. The one or more parameters can be indicative of a latency for scheduling resource blocks by the gNB 106. In at least one embodiment, the one or more parameters can include, a first parameter representing a cell level load of the gNB 106, a number of UEs connected to the gNB 106, a second parameter representing an amount of processing time for the gNB 106 to process the RRC setup request, a third parameter representing a traffic demand (congestion metric, traffic channel load, etc.) of the node, or the like.

In this embodiment, in response to the RRC setup request in the third message 114 and a determination that the pre-scheduling is enabled by the pre-scheduling logic 108, the gNB 106 sends an RRC setup message in a fourth message 204 to the UE 104. The fourth message 204, unlike the fourth message 118, contains a second grant that identifies the one or more pre-allocated SRBs allocated to the UE 104. In particular, the UE 104, in response to the fourth message 204, does not need to send an SR or wait for a resource allocation.

Upon successful completion of the RRC setup procedure 136, the UE 104 can send a fifth message 206 with an RRC setup complete message to the gNB 106. The fifth message 206 can specify that the fifth message 206 is a first segment and include buffer status report (Seg1; BSR). Upon successful completion of the RRC setup procedure 136, the UE 104 can enter the RRC_CONNECTED state. In this state, the UE 104 has an established RRC connection, allowing for efficient use of radio resources, enhanced mobility management, and the ability to engage in data transmission and reception. As described above, the RRC setup request facilitates the dynamic management of network resources, supports the implementation of various 5G services with different QoS requirements, and enables efficient mobility and connectivity management. The RRC Setup Procedure 136 can ensure that the UE 104 is synchronized with the network and has the necessary resources for communication.

As described above, scheduling SRBs to a UE can involve various operations by the UE 104 and the gNB 106 in the exchanges of messages that contribute to an overall latency for SRB scheduling. Since pre-scheduling is enabled, an SRB scheduling latency with pre-scheduling 208 can be a second amount of time that is made up of only a gNB processing time 210 for the gNB 106 to process the third message 114 and send the fourth message 204. In some cases, the SRB scheduling latency with pre-scheduling 208 can include a UE processing time 212 for the UE 104 to process the fourth message 204 with the second grant and sending the fifth message 206 with the RRC setup complete message. The second amount of time of the SRB scheduling latency with pre-scheduling 208 (with UE processing time 212 or without UE processing time 212) is less than the first amount of time of the SRB scheduling latency 126 of FIG. 1.

As described herein, the pre-scheduling logic 108 can reduce the overall latency for SRB scheduling when pre-scheduling is enabled. In particular, the pre-scheduling logic 108 can determine if SRBs can be pre-allocated to the UE 104 and provide an early grant that identifies the pre-allocated SRBs to the UE 104, effectively eliminating the gNB processing time 128, the UE processing time 130, the gNB processing time 132, and UE processing time 134.

Figure 3:
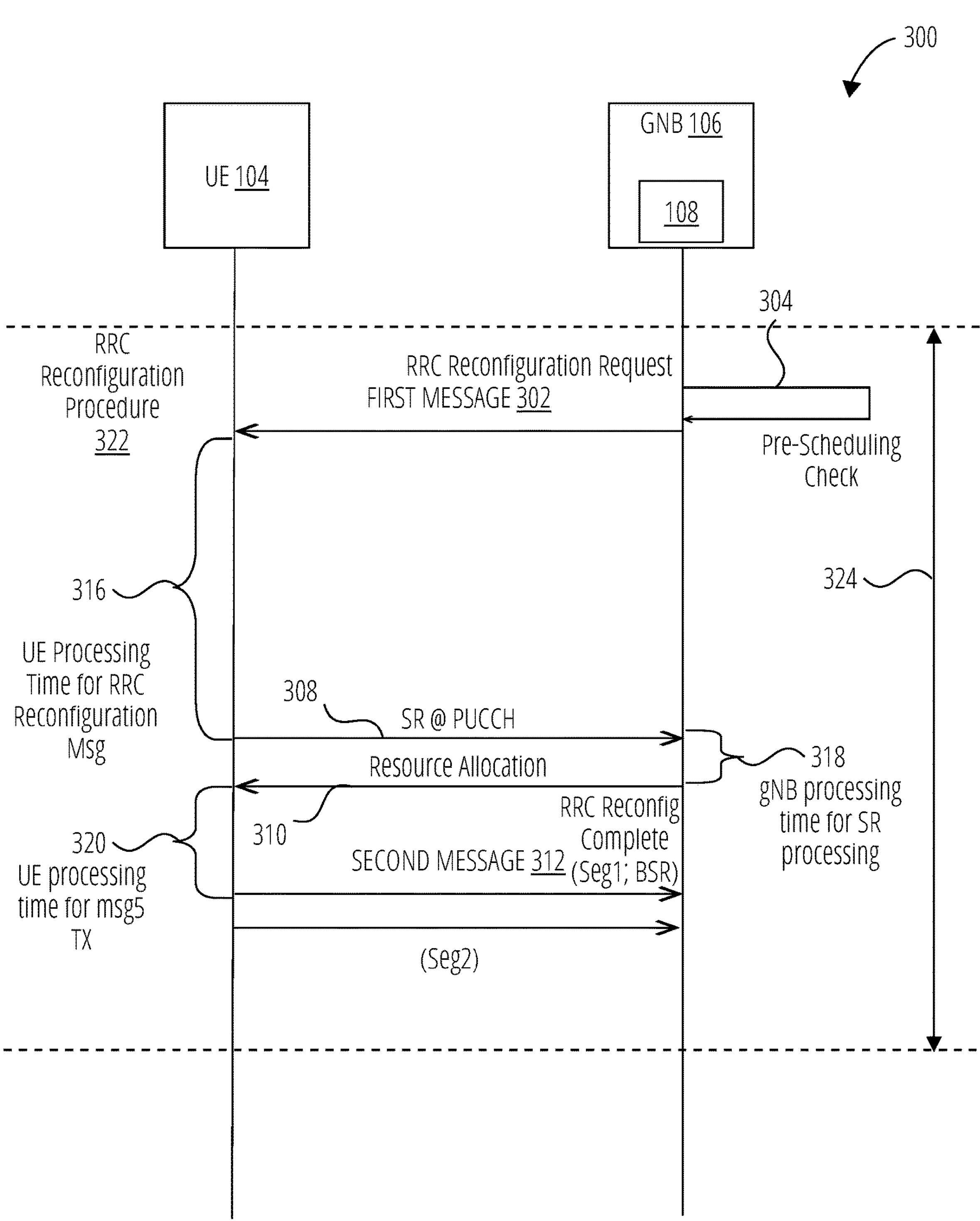
FIG. 3 is a sequence diagram of a process for scheduling resource blocks in an RRC reconfiguration procedure without pre-scheduling enabled according to at least one embodiment.
Figure 4:
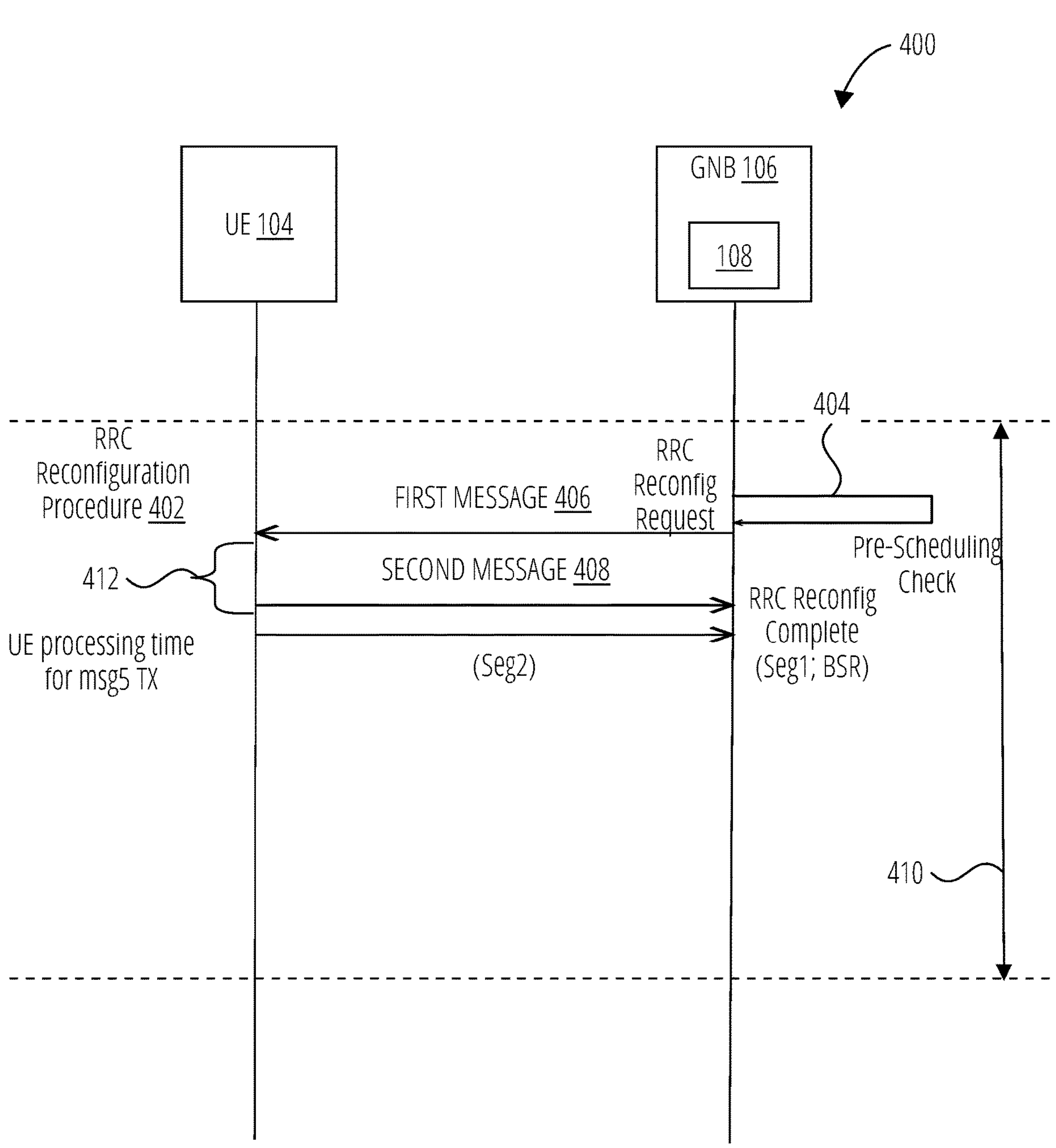
FIG. 4 is a sequence diagram of a process for scheduling resource blocks in an RRC reconfiguration procedure with pre-scheduling enabled according to at least one embodiment.

It should be noted that although FIG. 3 and FIG. 4 illustrate an RRC reconfiguration procedure in a 5G network, in other embodiments, the pre-scheduling logic 108 can be used for RRC reconfiguration procedures or in other procedures of other types of cellular networks, such as 6G networks, LTE, 4G, or the like.

FIG. 3 is a sequence diagram of a process 300 for scheduling resource blocks in an RRC reconfiguration procedure 322 without pre-scheduling enabled according to at least one embodiment. It should be noted that, in some cases, the RACH procedure 138 of FIG. 1 or FIG. 2 can be performed prior to the RRC reconfiguration procedure 322.

In general, the RRC Reconfiguration Procedure 322 (also referred to as RRC reconfiguration process) initiates when the gNB 106 identifies a need to alter a UE's configuration, a decision that may stem from a desire for network optimization, to meet specific service requirements, or in response to mobility-related events. Following this decision, the gNB 106 dispatches an RRC Reconfiguration message to the UE 104 in a first message 302, detailing the requisite modifications to its configuration. This comprehensive message equips the UE 104 with all necessary information to recalibrate its operations in line with the updated settings. In response, the UE 104 implements the adjustments outlined in the RRC Reconfiguration message. This adaptation may involve establishing new radio bearers or modifying existing ones, necessitating changes to the UE's radio interface to accommodate the new configuration. Upon successful modification of its settings, the UE 104 communicates the completion of this reconfiguration process back to the gNB through an RRC Reconfiguration Complete message in a second message 312, signaling the successful implementation of the changes. The RRC reconfiguration procedure 322 offers a dynamic and adaptable approach to managing network resources and services. The RRC reconfiguration procedure 322 can be used for sustaining high network performance levels, ensuring user satisfaction, and accommodating the extensive and varied demands placed on 5G services.

As illustrated in FIG. 3, the process 300 involves several steps, starting with the UE 104 sending the first message 302 with an RRC reconfiguration request. Unlike the RRC setup request of FIG. 1 that establishes a connection between the UE 104 and the gNB 106, transitioning the UE 104 from an idle state to a connected state, the RRC reconfiguration request is used to modify a configuration of the UE 104 that is already in an RRC_CONNECTED state. This process allows the network to update the UE's settings to adapt to changing network conditions, requirements, or to facilitate various network functionalities such as handover, introduction of new services, or modification of existing services. The RRC reconfiguration request can be used to adjust radio bearer configuration, mobility management security configuration, dual connectivity configuration, measurement configuration, or the like.

The process 300 involves operations performed by the UE 104 and gNB 106. In connection with determining to send an RRC reconfiguration request, the pre-scheduling logic 108 performs a pre-scheduling check 304 and determines whether pre-scheduling is enabled. If pre-scheduling of resource blocks is enabled, one or more SRBs can be pre-allocated to the UE 104 before receiving a scheduling request (SR) from the UE 104 for these resources. The pre-scheduling logic 108 can determine whether to enable pre-scheduling using one or more parameters. The one or more parameters can be indicative of a latency for scheduling resource blocks by the gNB 106. In at least one embodiment, the one or more parameters can include, a first parameter representing a cell level load of the gNB 106, a number of UEs connected to the gNB 106, a second parameter representing an amount of processing time for the gNB 106 to process the RRC setup request, a third parameter representing a traffic demand of the node (or congestion metric, traffic channel load, etc.), or the like. The one or more parameters can also include data demand associated with the gNB 106, a number of UEs connected to the gNB 106, a KPI or a state of an infrastructure resource of the cellular network, or a KPI or a state of the UE 104 connected to the gNB 106.

In response to a determination that the pre-scheduling is not enabled by the pre-scheduling logic 108, the gNB 106 sends the RRC reconfiguration request in the first message 302 to the UE 104. The first message 302 contains the necessary configuration details for the UE 104, including radio bearer settings, security configurations, and any other relevant parameters that the UE needs to communicate effectively with the gNB 106. As part of the RRC reconfiguration procedure 322, the UE 104 sends a scheduling request (SR) 308 to the gNB 106 on the PUCCH to transmit data in its buffer. In response to receiving the SR 308 on the PUCCH, the gNB 106 allocates one or more SRBs to the UE 104 and sends a resource allocation 310 identifying the one or more SRBs allocated to the UE 104. The resource allocation 310 can include a UL grant. It should be noted the gNB 106 can repeat the UL grant in the case of missed UE TX detection of the original UL grant after RRC reconfiguration request reception ACK. This can be done according to the pre-scheduling logic's configuration.

Upon successful completion of the RRC reconfiguration procedure 322, the UE 104 can send a second message 312 with an RRC reconfiguration complete message to the gNB 106. The second message 312 can specify that the second message 312 is a first segment and include buffer status report (Seg1; BSR).

The RRC reconfiguration procedure 322 can allow the network to update the UE's settings to adapt to changing network conditions, requirements, or facilitate various network functionalities, such as handover, introduction of new services, or modification of existing services. For UEs at the edge of coverage areas or in challenging environments, 5G NR includes features to enhance performance, such as increased preamble power and repetition techniques. One of the primary aspects of RRC reconfiguration is the adjustment of radio bearers, which involves the setup, modification, or release of these bearers to align data flow with the current Quality of Service (QOS) requirements and network conditions. This ensures that data transmission remains efficient and responsive to changing demands. Another aspect of RRC reconfiguration is mobility management that facilitates updates to mobility parameters, facilitating seamless handovers between cells and modifications to mobility policies. These updates are essential for maintaining uninterrupted service as UEs navigate different areas of the network, ensuring a consistent and reliable connection. The RRC reconfiguration can be used for adjusting security configuration to safeguard data protection and integrity. The RRC reconfiguration also addresses dual connectivity configuration, particularly with EN-DC (E-UTRA-NR Dual Connectivity). Adjustments in this area, such as adding, modifying, or releasing secondary cell group configurations, leverage both LTE and NR resources. This dual connectivity approach significantly improves performance and coverage, offering a more robust and efficient network experience. The RRC reconfiguration can be used for measurement configuration updates for optimizing network performance monitoring and the UE's measurement reporting behavior. These updates enable the network to better manage radio resources and mobility by providing accurate and timely data on network conditions and UE performance. The configuration of Signaling Radio Bearers (SRB) and Data Radio Bearers (DRB) can be adjusted to ensure efficient communication and data transfer. SRBs carry signaling messages, while DRBs handle user data, and changes to these bearers are made according to the current network and service needs, ensuring that communication remains fluid and effective across the network.

As described above, scheduling SRBs to a UE can involve various operations by the UE 104 and the gNB 106 in the exchanges of messages, such as RRC messages, that contribute to an overall latency for SRB scheduling. In particular, as illustrated in FIG. 3, an SRB scheduling latency 324 can be a first amount of time that is made up of a UE processing time 316 for the UE 104 to process the RRC reconfiguration message and send the SR 308 to the gNB 106 on the PUCCH, a gNB processing time 318 for the gNB 106 to process the SR 308 and send a resource allocation 310 to the SR 308, and a UE processing time 320 for the UE 104 to send an RRC reconfiguration complete message in the second message 312 to the gNB 106. As described above, the SRB scheduling latency 324 can contribute to a degradation to the user experience by UE 104 if too large.

TABLE 2 shows an example of latency between an RRC Reconfiguration message and an RRC Reconfiguration Complete message:

TABLE 2

| Index | Time | Code | Message | Details: |
|---|---|---|---|---|
| . . . | | | | |
| 157108 | 2024 Feb. 20 12:53:44:193491 | DL-DCCH [5gNR] | __rrcReconfiguration | slot: 6<br>scs: 0<br>sys__fn: 803<br>num__dci: 1<br>dci[0]<br>carrier__id: 0<br>rnti__type: C__RNTI (0)<br>dci__format: DL__1__1 (3)<br>agg__level: LEVEL__8 (3) |
| . . . | | | | |
| . . . | | | | |

TABLE 2-continued

| Index | Time | Code | Message | Details: |
|---|---|---|---|---|
| 157119 | 2024 Feb. 20 12:53:44:232861 | DL-DCCH [5gNR] | __rrcReconfigurationComplete | slot: 3<br>scs: 0<br>sys fn: 807<br>num dci: 1<br>dci[0]<br>carrier id: 0<br>rnti__type: C__RNTI (0)<br>dci__format: UL__0__0 (0)<br>agg__level: LEVEL__8 (3) |

As shown in TABLE 2, the RRC Reconfiguration message is sent on the DL_DCCH and system frame 803, subframe 6 (i.e., a RRC Reconfiguration (DL DCCH): SFN:803). The RRC Reconfiguration complete message is sent on the DL_DCCH on the system frame 807 (i.e., a RRC Reconfiguration Complete (DL DCCH): SFN:807). The latency between these two messages is approximately 39.37 milliseconds.

Even though the pre-scheduling logic 108 determined in the pre-scheduling check 304 that pre-scheduling was not enabled, the pre-scheduling logic 108 can reduce the overall latency for SRB scheduling when pre-scheduling is enabled because it can be determined that one or more resource blocks can be pre-allocated to the UE 104 before receiving an SR from the UE 104 for these resources, as described in more detail below with respect to FIG. 4. In particular, the pre-scheduling logic 108 can determine if SRBs can be pre-allocated to the UE 104 and provide an early grant that identifies the pre-allocated SRBs to the UE 104, effectively eliminating the UE processing time 316, gNB processing time 318, and UE processing time 320. The overall latency when pre-scheduling is enabled in SRB scheduling can include a processing time for the gNB 106 to process a first message with a grant identifying the pre-allocated SRBs, as described in more detail below with respect to FIG. 4, and send the second message 312 to the gNB 106.

FIG. 4 is a sequence diagram of a process 400 for scheduling resource blocks in an RRC reconfiguration procedure 402 with pre-scheduling enabled according to at least one embodiment. The process 400 involves similar operations performed by the UE 104 and gNB 106 in process 300 of FIG. 3, as noted by similar reference numbers. In this embodiment, the pre-scheduling logic 108 performs the pre-scheduling check 304 and determines that pre-scheduling is enabled. As described above, if pre-scheduling of resource blocks is enabled, one or more SRBs can be pre-allocated to the UE 104 before receiving a scheduling request (SR) from the UE 104 for these resources. The pre-scheduling logic 108 can determine whether to enable pre-scheduling using one or more parameters. The one or more parameters can be indicative of a latency for scheduling resource blocks by the gNB 106. In at least one embodiment, the one or more parameters can include, a first parameter representing a cell level load of the gNB 106, a number of UEs connected to the gNB 106, a second parameter representing an amount of processing time for the gNB 106 to process the RRC setup request, a third parameter representing a traffic demand (congestion metric, traffic channel load, etc.) of the node, or the like.

In this embodiment, in response to a determination that the pre-scheduling is enabled by the pre-scheduling logic 108, the gNB 106 sends an RRC reconfiguration request in a first message 406 to the UE 104. The first message 406, unlike the first message 302 of FIG. 3, contains a grant that identifies the one or more pre-allocated SRBs allocated to the UE 104. In particular, the UE 104, in response to the first message 406, does not need to send an SR or wait for a resource allocation.

Upon successful completion of the RRC reconfiguration procedure 402, the UE 104 can send a second message 408 with an RRC reconfiguration complete message to the gNB 106. The second message 408 can specify that the second message 408 is a first segment and include buffer status report (Seg1; BSR).

As described above, scheduling SRBs to a UE can involve various operations by the UE 104 and the gNB 106 in the exchanges of messages that contribute to an overall latency for SRB scheduling. Since pre-scheduling is enabled, an SRB scheduling latency with pre-scheduling 410 can be a second amount of time that is made up of only a UE processing time 412 for the UE 104 to process the first message 406 and send the second message 408. In some cases, the SRB scheduling latency with pre-scheduling 410 can include a gNB processing time for performing the pre-scheduling check 404 and sending the first message 406 with the grant of pre-allocated resource blocks. The second amount of time of the SRB scheduling latency with pre-scheduling 410 (with or without the gNB processing time), is less than the first amount of time of the SRB scheduling latency 324 of FIG. 3.

As described herein, the pre-scheduling logic 108 can reduce the overall latency for SRB scheduling when pre-scheduling is enabled. In particular, the pre-scheduling logic 108 can determine if SRBs can be pre-allocated to the UE 104 and provide an early grant that identifies the pre-allocated SRBs to the UE 104, effectively eliminating the UE processing time 316, gNB processing time 318, and UE processing time 320.

It should be noted that although FIG. 4 illustrates an RRC reconfiguration procedure 402 in a 5G network, in other embodiments, the pre-scheduling logic 108 can be used for RRC setup procedures or in other procedures of other types of cellular networks, such as 6G networks, LTE, 4G, or the like. For example, the embodiments of FIG. 3 and FIG. 4 illustrate an RRC reconfiguration procedure 322.

It should be noted that although FIG. 3 and FIG. 4 illustrate an RRC reconfiguration procedure in a 5G network, in other embodiments, the pre-scheduling logic 108 can be used for RRC reconfiguration procedures or in other procedures of other types of cellular networks, such as 6G networks, LTE, 4G, or the like.

In at least one embodiment, the pre-scheduling logic 108 can perform the pre-scheduling check 404 to determine whether to enable pre-scheduling using various thresholds. The thresholds can be based on user capacity, traffic demand, interference levels, latency requirements, or the like. For example, when the gNB 106 is servicing a single UE 104, the pre-scheduling logic 108 can enable pre-scheduling and pre-allocate all SRBs to the single UE 104. When the gNB 106 is servicing more UEs, such as five UEs, the pre-scheduling logic 108 can enable pre-scheduling but pre-allocate the SRBs evenly or in a weighted manner. However, when the gNB 106 is servicing more and more UE, such as ten UEs, the pre-scheduling logic 108 can disable pre-scheduling and not pre-allocate the SRBs to any of the UEs and the UEs have to schedule the SRBs as set forth in FIG. 1. For example, a user capacity threshold can be set at a specified number of UEs, such as 10 in the example above. Other user capacity thresholds can be used.

Similarly, the pre-scheduling logic 108 can pre-allocate the SRBs to one or more UEs based on the traffic demands of those one or more UEs, using a traffic demand threshold. That is, if the traffic demand is greater than a traffic demand threshold, the pre-scheduling logic 108 can disable pre-scheduling. In another embodiment, the pre-scheduling logic 108 can enable or disable pre-scheduling based on an interference level threshold. If the interference levels are higher than the interference level threshold, the pre-scheduling logic 108 can disable pre-scheduling. In some cases, one or more of the UEs can have latency requirements. The pre-scheduling logic 108 can use the latency requirement to determine whether to enable or disable pre-scheduling.

FIG. 5 is a flow diagram of a method 500 for prescheduling resource blocks according to at least one embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by the pre-scheduling logic 108 of FIG. 1 to FIG. 4. In one embodiment, the method 500 is performed by the gNB 106 of FIG. 1 to FIG. 4. In at least one embodiment, the method 500 is performed by a gNB of a 5G or 6G network. In another embodiment, the method 500 is performed by an eNB of an LTE network. In another embodiment, the method 500 is performed by a base station of a cellular network.

Referring to FIG. 5, the method 500 begins with the processing logic receiving, from a user equipment (UE), a first message comprising a random access channel (RACH) preamble (block 502). At block 504, the processing logic sends, to the UE, a second message comprising a random access response (RAR) with a first grant for the UE to send a third message. At block 506, the processing logic receives, from the UE, the third message comprising a radio resource control (RRC) message associated with the first grant. At block 508, the processing logic determines, using one or more parameters indicative of a latency for scheduling resource blocks by the node, that one or more scheduled resource blocks (SRBs) be pre-allocated to the UE before receiving a scheduling request (SR) from the UE. At block 510, the processing logic sends, to the UE, a fourth message comprising a second grant identifying the one or more SRBs pre-allocated to the UE.

In at least one embodiment, the RRC message includes an RRC setup request. By determining that the one or more SRBs can be pre-allocated to the UE, the processing logic reduces an overall latency of allocating the one or more SRBs to the UE, in response to the RRC setup request, from a first amount of time to a second amount of time. The first amount of time includes at least one of i) a first processing time for the node to process the third message and send an RRC setup response to the UE, ii) a second processing time for the UE to process the RRC setup response and send the SR to the node on a physical uplink control channel (PUCCH), iii) a third processing time for the node to process the SR and send a resource allocation response to the SR, or iv) a fourth processing time for the UE to send an RRC setup complete message to the node. The second amount of time only includes a fifth processing time for the node to process the third message and send the fourth message to the UE. In another embodiment, the second amount of time includes the fifth processing time and a sixth processing time for the UE to process the fourth message and send a fifth message to the node.

In at least one embodiment, the one or more parameters can include a first parameter representing a cell level load of the node, a number of UEs connected to the node, a second parameter representing an amount of processing time for the node to process the RRC message, a third parameter representing a traffic demand of the node, or the like.

In at least one embodiment, the method 500 further includes the processing logic determining, using the one or more parameters, a grant size for the second grant. The second grant identifies the grant size.

In at least one embodiment, the one or more parameters includes a receive signal strength indicator (RSSI) associated with the UE. The processing logic can determine, using the RSSI, a number of segments for the RRC message. The second grant identifies the number of segments.

In at least one embodiment, the RRC message includes an RRC reconfiguration request. By determining that the one or more SRBs be pre-allocated to the UE, the processing logic reduces an overall latency of allocating the one or more SRBs to the UE, in response to the RRC reconfiguration request, from a first amount of time to a second amount of time. The first amount of time includes at least one of i) a first processing time for the node to process the third message and send an RRC reconfiguration response to the UE, ii) a second processing time for the UE to process the RRC reconfiguration response and send the SR to the node on a physical uplink control channel (PUCCH), iii) a third processing time for the node to process the SR and send a resource allocation response to the SR, or iv) a fourth processing time for the UE to send an RRC reconfiguration complete message to the node. The second amount of time only includes a fifth processing time for the node to process the third message and send the fourth message to the UE. In at least one embodiment, the second amount of time includes the fifth processing time and a sixth processing time for the UE to process the fourth message and send a fifth message to the node.

As described herein, and illustrated in an example of Table 1, the UE and nodes can use the Hybrid Automatic Repeat reQuest (HARQ) protocol. The HARQ protocol is used in 5G networks (as well as in earlier mobile telecommunications standards like 3G and 4G) to enhance data transmission reliability over the wireless interface. HARQ combines high-speed error correction with retransmission mechanisms to ensure data integrity and improve the efficiency of data transmission. In the context of 5G, HARQ plays a critical role due to the network's high data rate requirements and the need for ultra-reliable low-latency communications (URLLC). In general, when data is transmitted over the air, it can be corrupted by noise, interference, or other propagation effects. Forward Error Correction (FEC) codes are used to detect and correct errors without the need for retransmission. However, FEC alone may not be sufficient for all errors. If errors are detected that cannot be corrected by FEC, the receiver requests a retransmission of the corrupted data. This process continues until the data is correctly received and decoded or a maximum number of attempts is reached. HARQ combines FEC and ARQ for more efficient error correction. When a data packet is first transmitted, it includes FEC redundancy. If the receiver cannot correctly decode the message, it retains the erroneous packet and requests a retransmission. Instead of retransmitting the original packet, the sender may transmit only additional redundancy information. The receiver combines the original and retransmitted packets, using the additional information to attempt to decode the combined message. This process can significantly improve the probability of correct decoding at the receiver while reducing the amount of data that needs to be retransmitted. In at least one embodiment, the node can send the grant shortly after receiving a HARQ acknowledgement (e.g., total_harq_ack_bits: 1) from the UE.

Figure 6A:
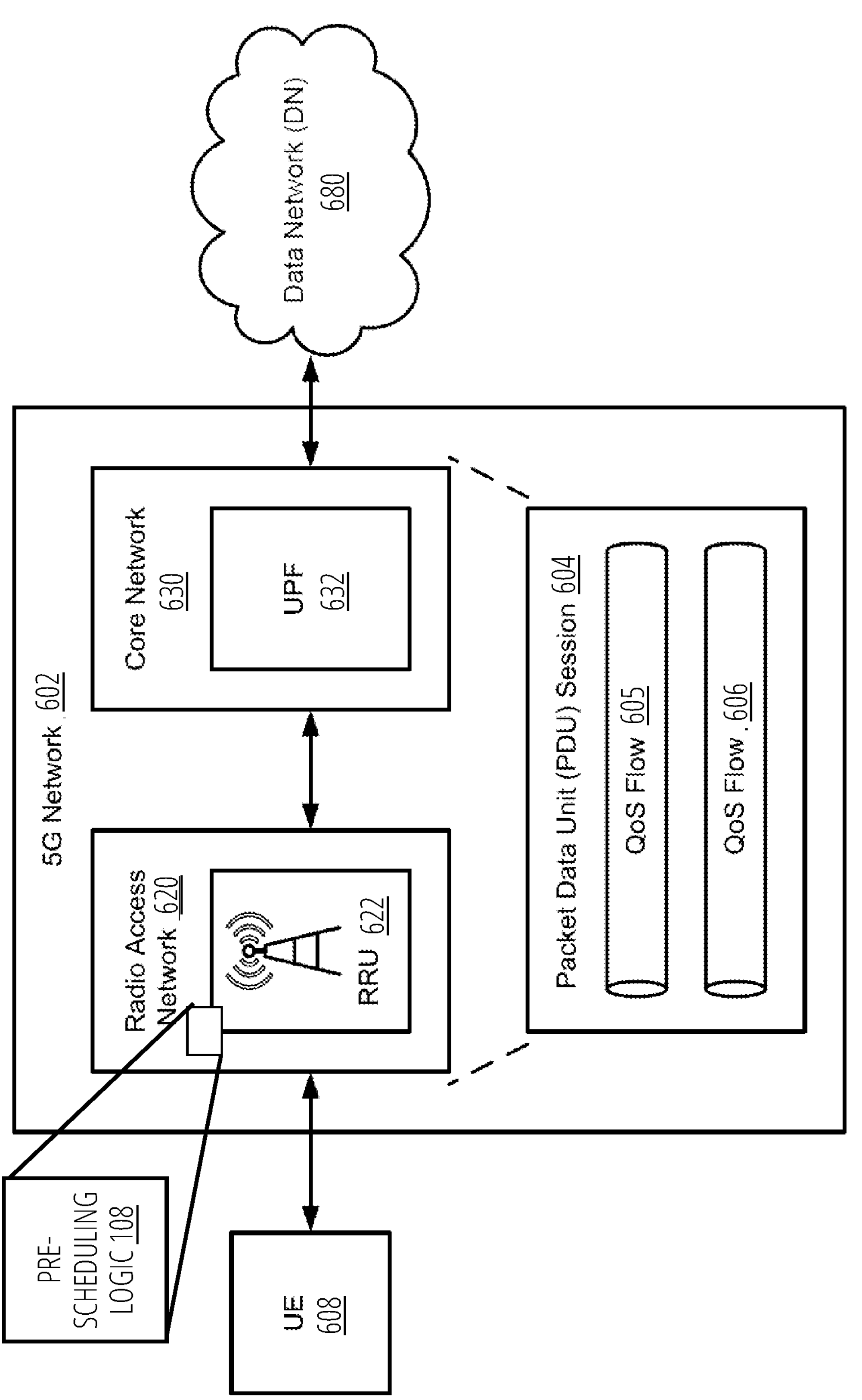
FIG. 6A depicts an embodiment of a 5G network including a radio access network (RAN), including pre-scheduling logic, and a core network, according to at least one embodiment.

FIG. 6A depicts a 5G network 602 including a radio access network (RAN) 620, including pre-scheduling logic 108, and a core network 630 according to at least one embodiment. In at least one embodiment, the pre-scheduling logic 108 can be implemented in the radio access network 620 to provide pre-scheduling operations as described herein. The RAN 620 can include a new-generation radio access network (NG-RAN) that uses the 5G new radio interface (NR). The 5G network 602 connects user equipment (UE) 608 to the data network (DN) 680 using the RAN 620 and the core network 630. The data network 680 can include the Internet, a local area network (LAN), a wide area network (WAN), a private data network, a wireless network, a wired network, or a combination of networks. The UE 608 can include an electronic device with wireless connectivity or cellular communication capability, such as a mobile phone or handheld computing device. In at least one example, the UE 608 can include a 5G smartphone or a 5G cellular device that connects to the RAN 620 via a wireless connection. The UE 608 can be one of a number of UEs not depicted that are in communication with the RAN 620. The UEs may include mobile and non-mobile computing devices. The UEs may include laptop computers, desktop computers, Internet-of-Things (IoT) devices, and/or any other electronic computing device that includes a wireless communications interface to access the RAN 620.

The RAN 620 includes a remote radio unit (RRU) 622 for wirelessly communicating with UE 608. The remote radio unit (RRU) 622 can include a Radio Unit (RU) and may include one or more radio transceivers for wirelessly communicating with UE 608. The remote radio unit (RRU) 622 may include circuitry for converting signals sent to and from an antenna of a Base Station into digital signals for transmission over packet networks. The RAN 620 may correspond with a 5G radio Base Station that connects user equipment to the core network 630. The 5G radio Base Station may be referred to as a generation Node B, a "gNodeB," or a "gNB." A Base Station may refer to a network element that is responsible for the transmission and reception of radio signals in one or more cells to or from user equipment, such as UE 608. In at least one embodiment, the pre-scheduling logic 108 can be implemented in the RRU 622 to perform the pre-scheduling operations described herein.

The core network 630 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions 640 may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions can include the access and mobility management function (AMF), the session management function (SMF), and the user plane function (UPF). The UPF (e.g., UPF 632) may perform packet processing including routing and forwarding, quality of service (QOS) handling, and packet data unit (PDU) session management. The UPF may serve as an ingress and egress point for user plane traffic and provide anchored mobility support for user equipment. For example, the UPF 632 may provide an anchor point between the UE 608 and the data network 680 as the UE 608 moves between coverage areas. The AMF may act as a single-entry point for a UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice can include an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the RAN 620, such as a Distributed Unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the Distributed Unit (DU) and the centralized unit (CU) of the RAN 620 may be co-located with the remote radio unit (RRU) 622. In other embodiments, the Distributed Unit (DU) and the remote radio unit (RRU) 622 may be co-located at a cell site and the centralized unit (CU) may be located within a local data center (LDC).

The 5G network 602 may provide one or more network slices, where each network slice may include a set of network functions that are selected to provide specific telecommunications services. For example, each network slice can include a configuration of network functions, network applications, and underlying cloud-based compute and storage infrastructure. In some cases, a network slice may correspond with a logical instantiation of a 5G network, such as an instantiation of the 5G network 602. In some cases, the 5G network 602 may support customized policy configuration and enforcement between network slices per service level agreements (SLAs) within the radio access network (RAN) 620. User equipment, such as UE 608, may connect to multiple network slices at the same time (e.g., eight different network slices). In one embodiment, a PDU session, such as PDU session 604, may belong to only one network slice instance.

In some cases, the 5G network 602 may dynamically generate network slices to provide telecommunications services for various use cases, such the enhanced Mobile Broadband (cMBB), Ultra-Reliable and Low-Latency Communication (URLCC), and massive Machine Type Communication (mMTC) use cases.

A cloud-based compute and storage infrastructure can include a networked computing environment that provides a cloud computing environment. Cloud computing may refer to Internet-based computing, where shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 630 may include a set of network elements that are configured to offer various data and telecommunications services to subscribers or end users of user equipment, such as UE 608. Examples of network elements include network computers, network processors, networking hardware, networking equipment, routers, switches, hubs, bridges, radio network controllers, gateways, servers, virtualized network functions, and network functions virtualization infrastructure. A network element can include a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine can include a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The 5G network 602 may implement various network functions, such as the core network functions and radio access network functions, using a cloud-based compute and storage infrastructure. A network function may be implemented as a software instance running on hardware or as a virtualized network function. Virtual network functions (VNFs) can include implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 6A, the core network 630 includes a user plane function (UPF) 632 for transporting IP data traffic (e.g., user plane traffic) between the UE 608 and the data network 680 and for handling packet data unit (PDU) sessions with the data network 680. The UPF 632 can include an anchor point between the UE 608 and the data network 680. The UPF 632 may be implemented as a software process or application running within a virtualized infrastructure or a cloud-based compute and storage infrastructure. The 5G network 602 may connect the UE 608 to the data network 680 using a PDU session 604, which can include part of an overlay network.

The PDU session 604 may utilize one or more quality of service (QOS) flows, such as QoS flows 605 and 606, to exchange traffic (e.g., data and voice traffic) between the UE 608 and the data network 680. The one or more QoS flows can include the finest granularity of QoS differentiation within the PDU session 604. The PDU session 604 may belong to a network slice instance through the 5G network 602. To establish user plane connectivity from the UE 608 to the data network 680, an AMF that supports the network slice instance may be selected and a PDU session via the network slice instance may be established. In some cases, the PDU session 604 may be of type IPv4 or IPv6 for transporting IP packets. The RAN 620 may be configured to establish and release parts of the PDU session 604 that cross the radio interface.

The RAN 620 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 608, over a geographic area. Some cells may correspond with stationary coverage areas and other cells may correspond with coverage areas that change over time (e.g., due to movement of a mobile RRU).

In some cases, the UE 608 may be capable of transmitting signals to and receiving signals from one or more RRUs within the network of cells over time. One or more cells may correspond with a cell site. The cells within the network of cells may be configured to facilitate communication between UE 608 and other UEs and/or between UE 608 and a data network, such as data network 680. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mm Wave frequencies with high-speed connectivity to UEs within a short distance of the small cells. Macrocells may transmit and receive radio signals using multiple-input multiple-output (MIMO) antennas that may be connected to a cell tower, an antenna mast, or a raised structure.

Referring to FIG. 6A, the UPF 632 may be responsible for routing and forwarding user plane packets between the RAN 620 and the data network 680. Uplink packets arriving from the RAN 620 may use a general packet radio service (GPRS) tunneling protocol (or GTP) to reach the UPF 632. The GPRS tunneling protocol for the user plane may support multiplexing of traffic from different PDU sessions by tunneling user data over the interface between the RAN 620 and the UPF 632.

The UPF 632 may remove the packet headers belonging to the GTP tunnel before forwarding the user plane packets towards the data network 680. As the UPF 632 may provide connectivity towards other data networks in addition to the data network 680, the UPF 632 must ensure that the user plane packets are forwarded towards the correct data network. Each GTP tunnel may belong to a specific PDU session, such as PDU session 604. Each PDU session may be set up towards a specific data network name (DNN) that uniquely identifies the data network to which the user plane packets should be forwarded. The UPF 632 may keep a record of the mapping between the GTP tunnel, the PDU session, and the DNN for the data network to which the user plane packets are directed.

Downlink packets arriving from the data network 680 are mapped onto a specific QoS flow belonging to a specific PDU session before forwarded towards the appropriate RAN 620. A QoS flow may correspond with a stream of data packets that have equal quality of service (QOS). A PDU session may have multiple QoS flows, such as the QoS flows 605 and 606 that belong to PDU session 604. The UPF 632 may use a set of service data flow (SDF) templates to map each downlink packet onto a specific QoS flow. The UPF 632 may receive the set of SDF templates from a session management function (SMF), such as the SMF 633 depicted in FIG. 6B, during setup of the PDU session 604. The SMF may generate the set of SDF templates using information provided from a policy control function (PCF), such as the PCF 635 depicted in FIG. 6C. The UPF 632 may track various statistics regarding the volume of data transferred by each PDU session, such as PDU session 604, and provide the information to an SMF.

Figure 6B:
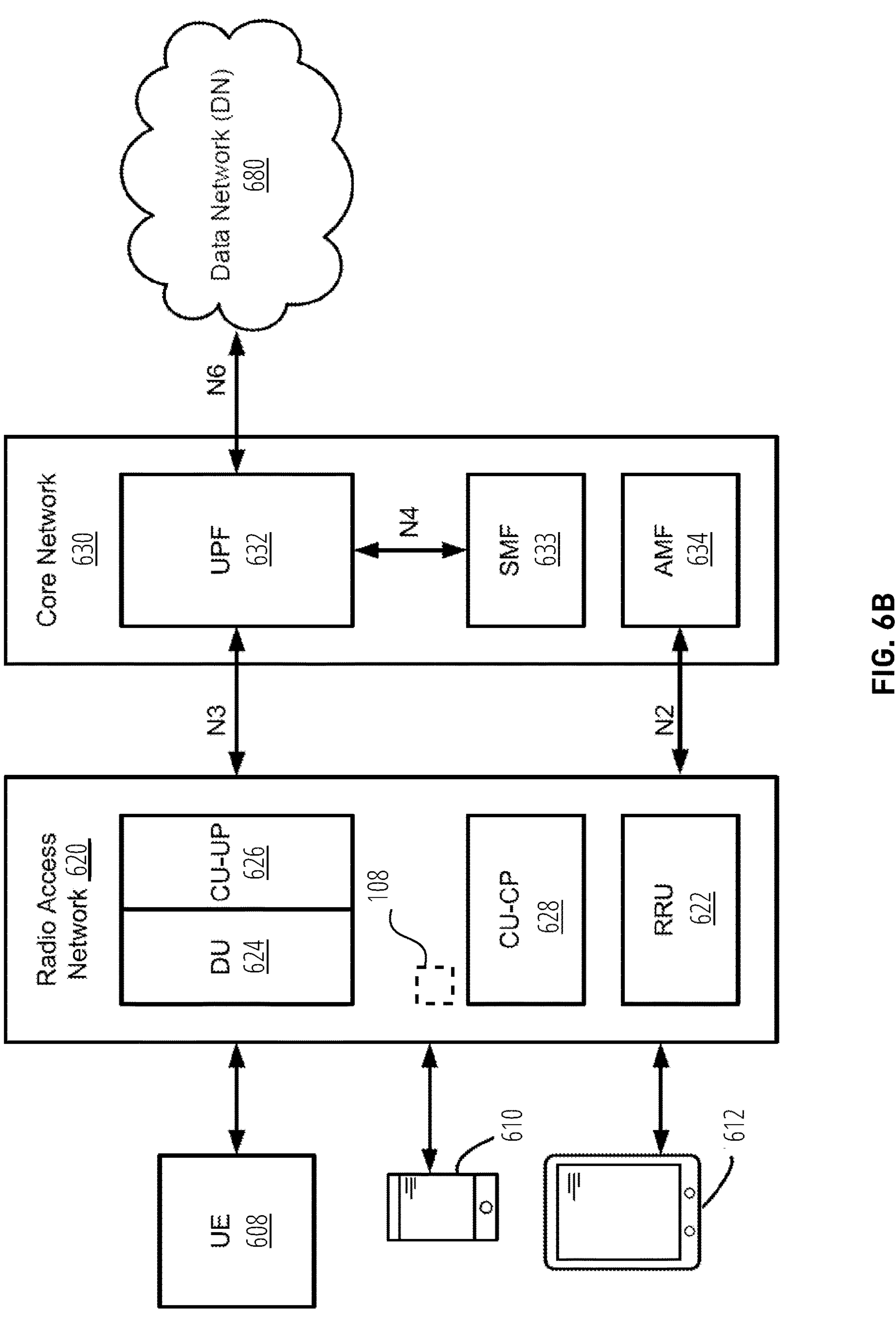
FIG. 6B-FIG. 6C depict various embodiments of a radio access network and a core network for providing a communications channel (or channel) between user equipment and data network according to at least one embodiment.

FIG. 6B depicts a RAN 620 and a core network 630 for providing a communications channel (or channel) between user equipment and data network 680 according to at least one embodiment. In at least one embodiment, the pre-scheduling logic 108 can be implemented in a scheduler of the radio access network 620 to provide the pre-scheduling operations described herein. The communications channel can include a pathway through which data is communicated between the UE 608 and the data network 680. The user equipment in communication with the RAN 620 includes UE 608, mobile phone 610, and mobile computing device 612. The user equipment may include a set of electronic devices, including mobile computing device and non-mobile computing device.

The core network 630 includes network functions such as an access and mobility management function (AMF) 634, a session management function (SMF) 633, and a user plane function (UPF) 632. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 608. When user equipment is leaving a first coverage area and entering a second coverage area, the AMF may be responsible for coordinating the handoff between the coverage areas whether the coverage areas are associated with the same radio access network or different radio access networks.

The UPF 632 may transfer downlink data received from the data network 680 to user equipment, such as UE 608, via the RAN 620 and/or transfer uplink data received from user equipment to the data network 680 via the RAN 620. An uplink can include a radio link though which user equipment transmits data and/or control signals to the RAN 620. A downlink can include a radio link through which the RAN 620 transmits data and/or control signals to the user equipment.

The RAN 620 may be logically divided into a remote radio unit (RRU) 622, a Distributed Unit (DU) 704, and a centralized unit (CU) that is partitioned into a CU user plane portion (CU-UP) 716 and a CU control plane portion (CU-CP) 628. The CU-UP 716 may correspond with the centralized unit for the user plane and the CU-CP 628 may correspond with the centralized unit for the control plane. The CU-CP 628 may perform functions related to a control plane, such as connection setup, mobility, and security. The CU-UP 716 may perform functions related to a user plane, such as user data transmission and reception functions. Additional details of radio access networks are described in reference to FIG. 7A.

Decoupling control signaling in the control plane from user plane traffic in the user plane may allow the UPF 632 to be positioned in close proximity to the edge of a network compared with the AMF 634. As a closer geographic or topographic proximity may reduce the electrical distance, this means that the electrical distance from the UPF 632 to the UE 608 may be less than the electrical distance of the AMF 634 to the UE 608. The RAN 620 may be connected to the AMF 634, which may allocate temporary unique identifiers, determine tracking areas, and select appropriate policy control functions (PCFs) for user equipment, via an N2 interface. The N3 Interface may be used for transferring user data (e.g., user plane traffic) from the RAN 620 to the user plane function UPF 632 and may be used for providing low-latency services using edge computing resources. The electrical distance from the UPF 632 (e.g., located at the edge of a network) to user equipment, such as UE 608, may impact the latency and performance services provided to the user equipment. The UE 608 may be connected to the SMF 633 via an N1 interface not depicted, which may transfer UE information directly to the AMF 634. The UPF 632 may be connected to the data network 680 via an N6 interface. The N6 interface may be used for providing connectivity between the UPF 632 and other external or internal data networks (e.g., to the Internet). The RAN 620 may be connected to the SMF 633, which may manage UE context and network handovers between Base Stations, via the N2 interface. The N2 interface may be used for transferring control plane signaling between the RAN 620 and the AMF 634.

The RRU 702*a* (702*b*, 702*c*) may perform physical layer functions, such as employing orthogonal frequency-division multiplexing (OFDM) for downlink data transmission. In some cases, the DU 704 may be located at a cell site (or a cellular Base Station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer can include the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular Base Stations) and 180 different RRUs.

In some embodiments, the RAN 620 or portions of the RAN 620 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 704 and CU-UP 716 may be executed as virtual instances within a data center environment that provides single-digit millisecond latencies (e.g., less than 2 ms) from the virtual instances to the UE 608.

Figure 6C:
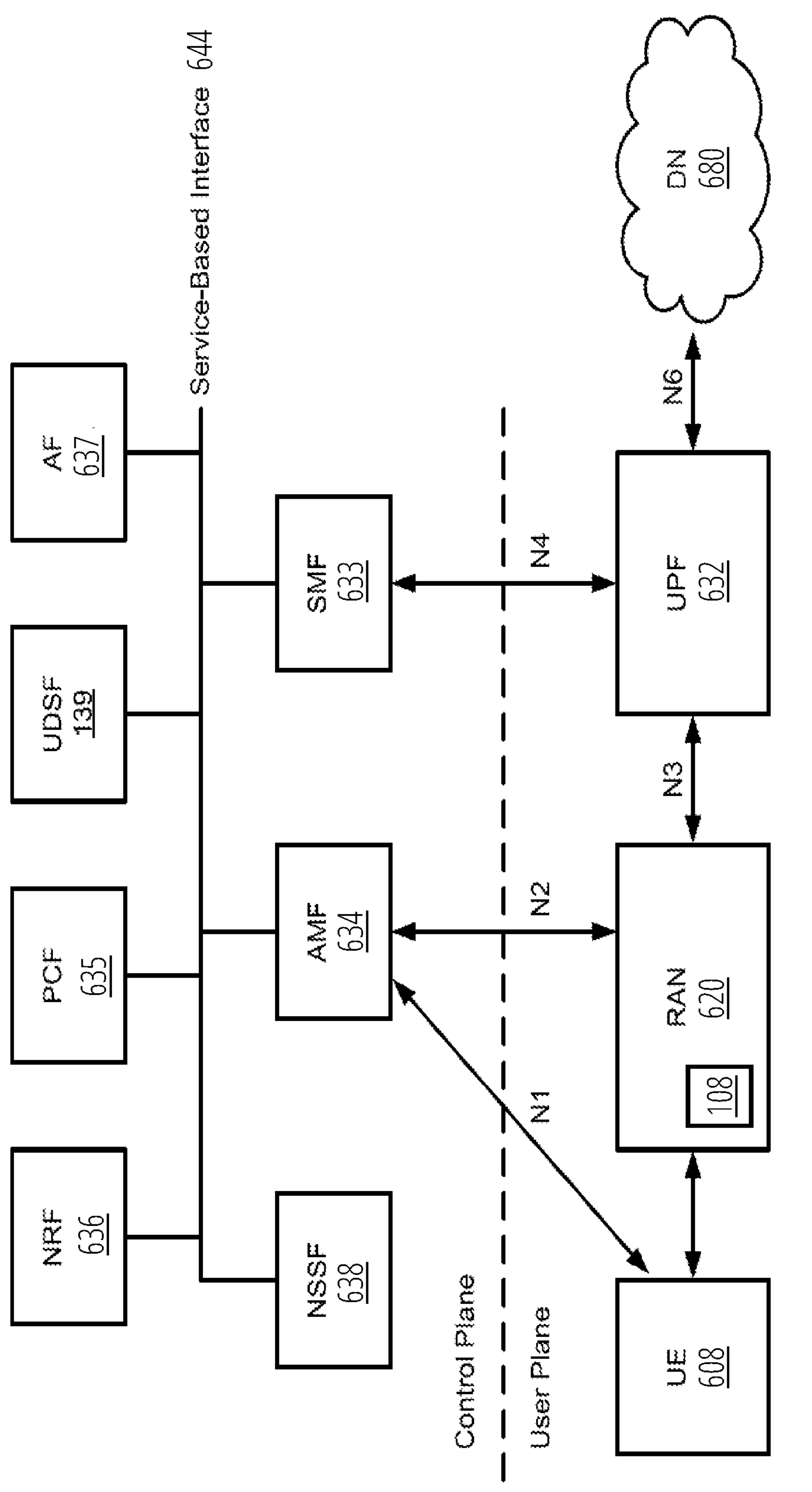

FIG. 6C depicts network functions interacting between user and control planes according to at least one embodiment. The logical connections between the network functions depicted in FIG. 6C should not be interpreted as direct physical connections. The RAN 620 is connected to the user plane function UPF 632 via interface N3. In at least one embodiment, the radio access network 620 includes the pre-scheduling logic 108 to perform pre-scheduling operations described herein. The UPF 632 is connected to the data network 680 via the N6 interface. In some cases, the data network 680 may represent an edge computing network or resources, such as a mobile edge computing (MEC) network. UE 608 connects to the AMF 634, which is responsible for authentication and authorization of access requests, as well as mobility management functions via the N1 interface.

In a service-based view, the AMF 634 may communicate with other network functions through a service-based interface 644 using application programming interfaces (APIs). The SMF 633 can include a network function that is responsible for the allocation and management of IP addresses that are assigned to the UE 608, as well as the selection of the UPF 632 for traffic associated with a particular PDU session for the UE 608. The SMF 633 may also communicate with other network functions through the service-based interface 644 using application programming interfaces (APIs). Each of the network functions NRF 636, PCF 635, UDSF 139, AF 637, NSSF 638, AMF 634, and SMF 633 may communicate with each other via the service-based interface 644 using application programming interfaces (APIs). The unstructured data storage function (UDSF) 139 may provide service interfaces to store, update, read, and delete network function data. Using the UDSF 139, network functions such as the PCF 635, SMF 633, and AMF 634 may remain stateless or primarily stateless.

Figure 6D:
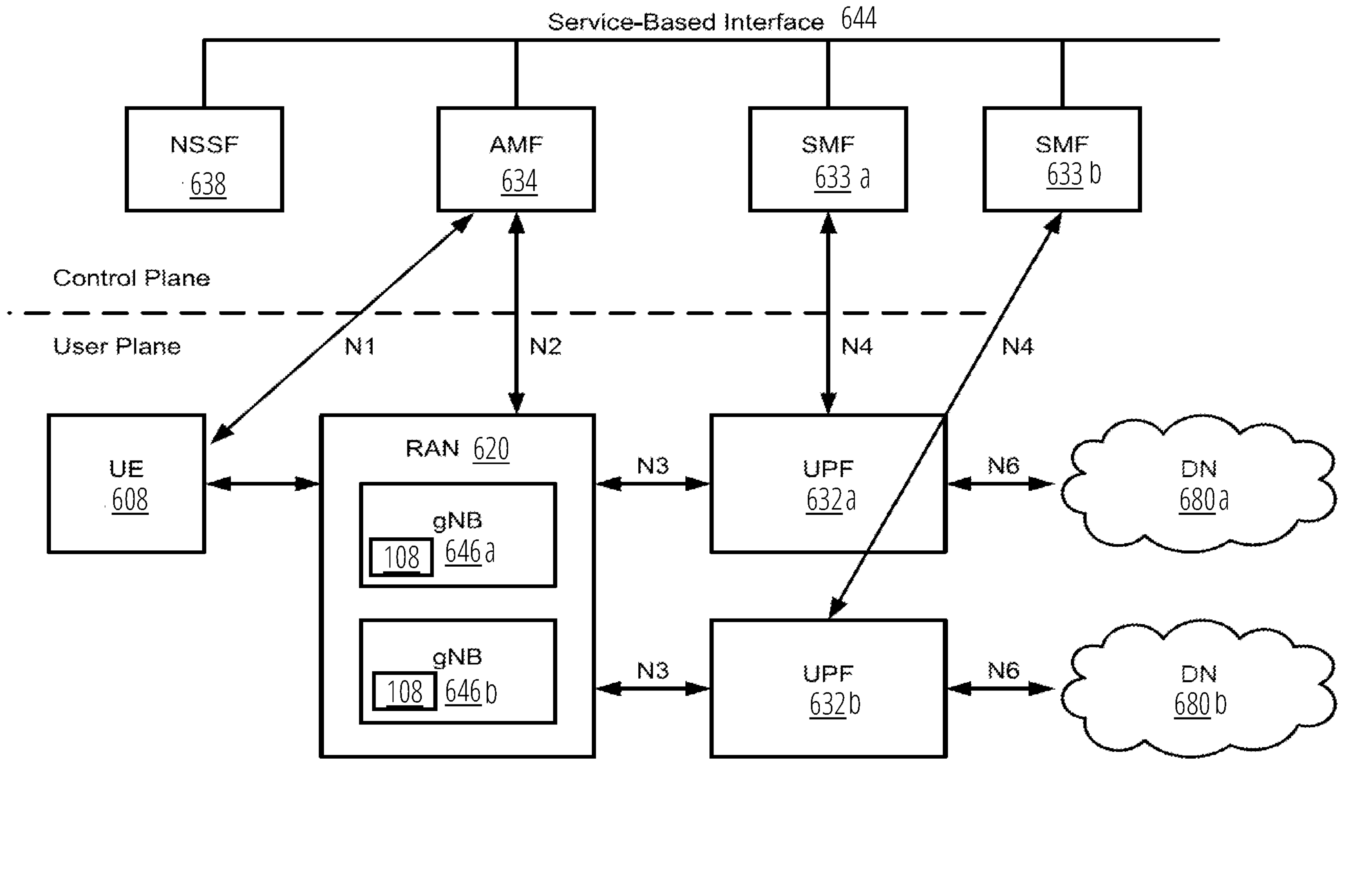
FIG. 6D depicts another embodiment of network functions interacting between user and control planes according to at least one embodiment.

FIG. 6D depicts network functions interacting between user and control planes according to at least one embodiment. As depicted, UPFs 632*a*-632*b* (also referred to as UPFs 632) are in communication with data networks (DNS) 680*a*-680*b* (also referred to as DNs 680). In some cases, a set of UPFs 632 may be connected in series between the RAN 620 and a set of DNs 680. The RAN 620 may include gNBs 646*a*-646*b* (also referred to as gNBs 646). Each gNB 646 can include at least a DU 704, a CU-UP 716, and a CU-CP 714. In at least one embodiment, the gNB 646*a* can include pre-scheduling logic 108 to perform pre-scheduling operations for the gNB 646*a* and the gNB 646*b* can include the pre-scheduling logic 108 to perform pre-scheduling operations for the gNB 646*b*.

Multiple PDU sessions to different data networks may be accommodated through the use of multiple UPFs in parallel. For the sake of clarity, some of the network functions depicted in FIG. 6C have been omitted, however it should be understood that the omitted network functions may interact with the network functions depicted in FIG. 6D. Each UPF 632*a*-632*b* may be associated with a PDU session, and may connect to a corresponding SMF 633*a*-633*b* over an N4 interface to receive session control information. If the UE 608 has multiple PDU sessions active, then each PDU session may be supported by a different UPF 632, each of which may be connected to an SMF 633 over an N4 interface. It should also be understood that any of the network functions may be virtualized within a network, and that the network itself may be provided as a network slice.

Figure 7A:
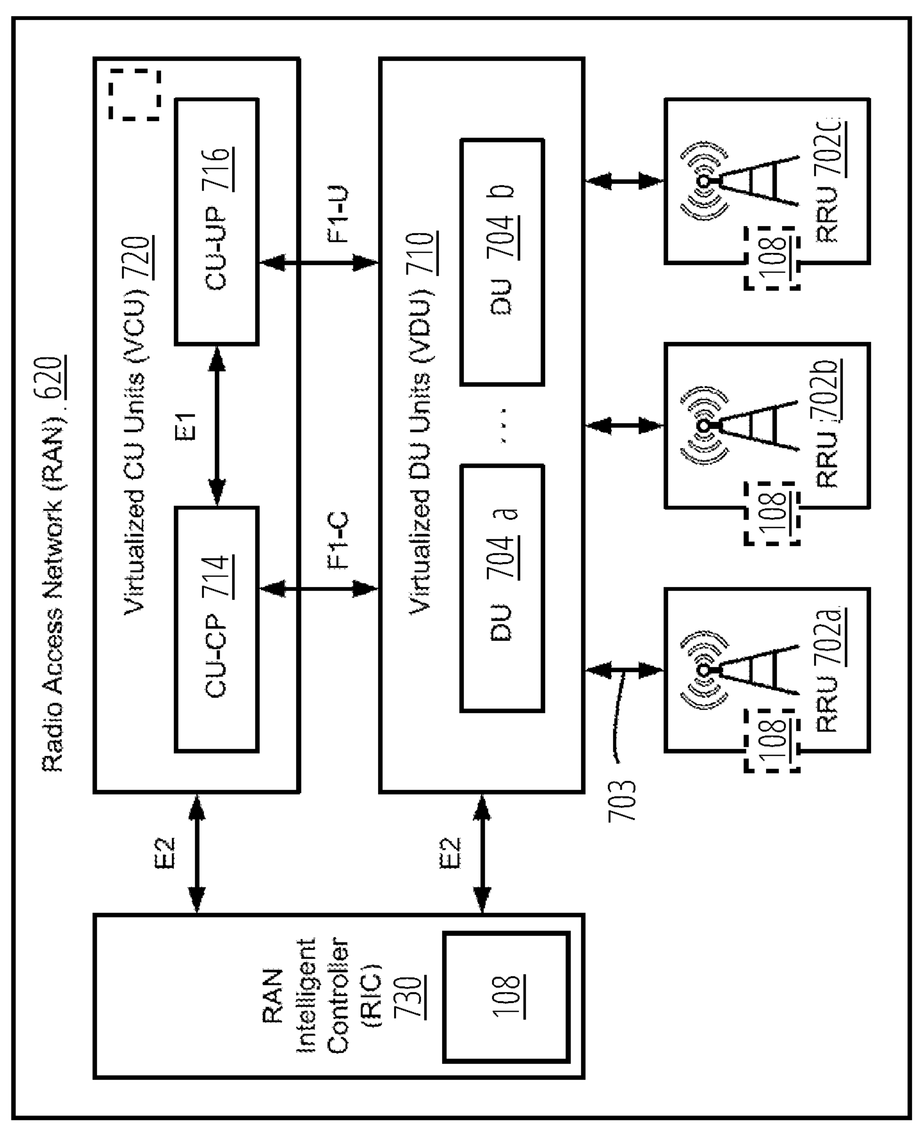

FIG. 7A depicts a RAN 620 according to at least one embodiment. The RAN 620 includes virtualized CU units (VCU) 720, virtualized DU units (VDU) 710, remote radio units (RRUs) 702*a*-702*c*, and a RAN intelligent controller (RIC) 730. In at least one embodiment, the pre-scheduling logic 108 can be implemented in the RIC 730 to perform the pre-scheduling operations described herein. The virtualized DU units 710 can include virtualized versions of distributed units (DUs) 704. The Distributed Unit (DU) 704 can include a logical node configured to provide functions for the radio link control (RLC) layer, the medium access control (MAC) layer, and the physical layer (PHY) layers. The virtualized CU units 720 can include virtualized versions of centralized units (CUs) including a centralized unit for the user plane CU-UP 716 and a centralized unit for the control plane CU-CP 714. In one example, the centralized units (CUs) can include a logical node configured to provide functions for the radio resource control (RRC) layer, the packet data convergence control (PDCP) layer, and the service data adaptation protocol (SDAP) layer. The centralized unit for the control plane CU-CP 714 can include a logical node configured to provide functions of the control plane part of the RRC and PDCP. The centralized unit for the user plane CU-UP 716 can include a logical node configured to provide functions of the user plane part of the SDAP and PDCP. Virtualizing the control plane and user plane functions allows the centralized units (CUs) to be consolidated in one or more data centers on RAN-based open interfaces.

The remote radio units (RRUs) 702*a*-702*c* may correspond with different cell sites. A single DU may connect to multiple RRUs via a fronthaul interface 703. In at least one embodiment, the pre-scheduling logic 108 can be implemented in the individual RRUs 702*a*-702*c* to perform the pre-scheduling operations described herein. The fronthaul interface 703 may provide connectivity between DUs and RRUs. For example, DU 704*a* may connect to 18 RRUs via the fronthaul interface 703. A centralized unit (CU) may control the operation of multiple DUs via a midhaul F1 Interface that includes the F1-C and F1-U interfaces. The F1 Interface may support control plane and user plane separation, and separate the Radio Network Layer and the Transport Network Layer. In one example, the centralized unit for the control plane CU-CP 714 may connect to ten different DUs within the virtualized DU units 710. In this case, the centralized unit for the control plane CU-CP 714 may control ten DUs and 180 RRUs. A single Distributed Unit (DU) 704 may be located at a cell site or in a local data center. Centralizing the Distributed Unit (DU) 704 at a local data center or at a single cell site location instead of distributing the DU 704 across multiple cell sites may result in reduced implementation costs.

The centralized unit for the control plane CU-CP 714 may host the radio resource control (RRC) layer and the control plane part of the packet data convergence control (PDCP) layer. The E1 Interface may separate the Radio Network Layer and the Transport Network Layer. The CU-CP 714 terminates the E1 Interface connected with the centralized unit for the user plane CU-UP 716 and the F1-C interface connected with the distributed units (DUs) 704. The centralized unit for the user plane CU-UP 716 hosts the user plane part of the packet data convergence control (PDCP) layer and the service data adaptation protocol (SDAP) layer. The CU-UP 716 terminates the E1 Interface connected with the centralized unit for the control plane CU-CP 714 and the F1-U interface connected with the distributed units (DUs) DU 704. The distributed units (DUs) 704 may handle the lower layers of the baseband processing up through the packet data convergence control (PDCP) layer of the protocol stack. The interfaces F1-C and E1 may carry signaling information for setting up, modifying, relocating, and/or releasing a UE context.

The RAN intelligent controller (RIC) 730 may control the underlying RAN elements via the E2 Interface. The E2 Interface connects the RAN intelligent controller (RIC) 730 to the distributed units (DUs) 704 and the centralized units CU-CP 714 and CU-UP 716. The RAN intelligent controller (RIC) 730 can include a near-real time RIC. A non-real-time RIC (NRT-RIC) not depicted can include a logical node allowing non-real time control rather than near-real-time control and the near-real-time RIC 730 can include a logical node allowing near-real-time control and optimization of RAN elements and resources on the bases of information collected from the distributed units (DUs) 704 and the centralized units CU-CP 714 and CU-UP 716 via the E2 Interface.

The virtualization of the distributed units (DUs) 704 and the centralized units CU-CP 714 and CU-UP 716 allows various deployment options that may be adjusted over time based on network conditions and network slice requirements. In at least one example, both a Distributed Unit (DU) 704 and a corresponding centralized unit CU-UP 716 may be implemented at a cell site. In another example, a Distributed Unit (DU) 704 may be implemented at a cell site and the corresponding centralized unit CU-UP 716 may be implemented at a local data center (LDC). In another example, both a Distributed Unit (DU) 704 and a corresponding centralized unit CU-UP 716 may be implemented at a local data center (LDC). In another example, both a Distributed Unit (DU) 704 and a corresponding centralized unit CU-UP 716 may be implemented at a cell site, but the corresponding the centralized unit CU-CP 714 may be implemented at a local data center (LDC). In another example, a Distributed Unit (DU) 704 may be implemented at a local data center (LDC) and the corresponding centralized units CU-CP 714 and CU-UP 716 may be implemented at an edge data center (EDC).

In some embodiments, network slicing operations may be communicated via the E1, F1-C, and F1-U interfaces of the RAN 620. For example, CU-CP 714 may select the appropriate DU 704 and CU-UP 716 entities to serve a network slicing request associated with a particular service level agreement (SLA).

Figure 7B:
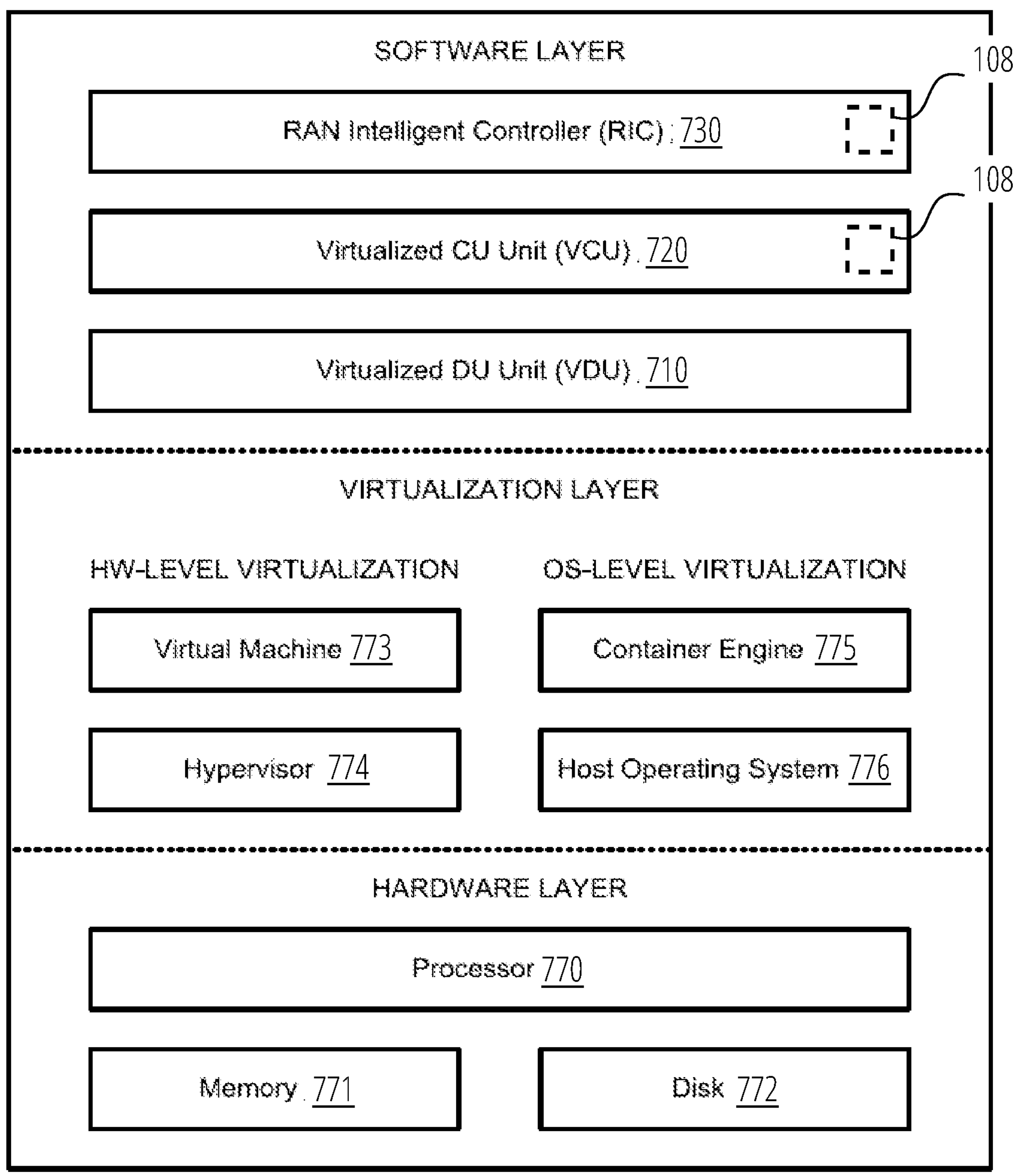

FIG. 7B depicts a RAN 620 according to at least one embodiment. As depicted, the RAN 620 includes hardware-level components and software-level components. The hardware-level components include one or more processors 770, one or more memory 771, and one or more disks 772. The one or more memory 771 can be communicatively coupled with and readable by the one or more processors 770 (or processing devices). The one or more memory 771 can have stored therein processor-readable instructions when, when executed by the one or more processors 770, cause the one or more processors 770 to perform operations described herein. The software-level components include software applications, such as a RAN intelligent controller (RIC) 730, virtualized CU unit (VCU) 720, and virtualized DU unit (VDU) 710. The software-level components may be run using the hardware-level components or executed using processor and storage components of the hardware-level components. In one example, one or more of the RIC 730, VCU 720, and VDU 710 may be run using the processor 770, memory 771, and disk 772. In another example, one or more of the RIC 730, VCU 720, and VDU 710 may be run using a virtual processor and a virtual memory that are themselves executed or generated using the processor 770, memory 771, and disk 772. In at least one embodiment, the pre-scheduling logic 108 can be implemented in the RIC 730 to perform the pre-scheduling operations described herein. In at least one embodiment, the pre-scheduling logic 108 can be implemented in the VCU 720 to perform the pre-scheduling operations described herein.

The software-level components also include virtualization layer processes, such as virtual machine 773, hypervisor 774, container engine 775, and host operating system 776. The hypervisor 774 can include a native hypervisor (or bare-metal hypervisor) or a hosted hypervisor (or type 2 hypervisor). The hypervisor 774 may provide a virtual operating platform for running one or more virtual machines, such as virtual machine 773. A hypervisor can include software that creates and runs virtual machine instances. Virtual machine 773 may include a set of virtual hardware devices, such as a virtual processor, a virtual memory, and a virtual disk. The virtual machine 773 may include a guest operating system that has the capability to run one or more software applications, such as the RAN intelligent controller (RIC) 730. The virtual machine 773 may run the host operating system 776 upon which the container engine 775 may run. A virtual machine, such as virtual machine 773, may include one or more virtual processors.

A container engine 775 may run on top of the host operating system 776 in order to run multiple isolated instances (or containers) on the same operating system kernel of the host operating system 776. Containers may perform virtualization at the operating system level and may provide a virtualized environment for running applications and their dependencies. The container engine 775 may acquire a container image and convert the container image into running processes. In some cases, the container engine 775 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container can include the unit of replication. Other computing platforms may wrap one or more containers into a pod and therefore a pod can include the unit of replication.

A replication controller may be used to ensure that a specified number of replicas of a pod are running at the same time. If less than the specified number of pods are running (e.g., due to a node failure or pod termination), then the replication controller may automatically replace a failed pod with a new pod. In some cases, the number of replicas may be dynamically adjusted based on a prior number of node failures. For example, if it is detected that a prior number of node failures for nodes in a cluster running a particular network slice has exceeded a threshold number of node failures, then the specified number of replicas may be increased (e.g., increased by one). Running multiple pod instances and keeping the specified number of replicas constant may prevent users from losing access to their application in the event that a particular pod fails or becomes inaccessible.

In some embodiments, a virtualized infrastructure manager not depicted may run on the RAN 620 in order to provide a centralized platform for managing a virtualized infrastructure for deploying various components of the RAN 620. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines.

Figure 7C:
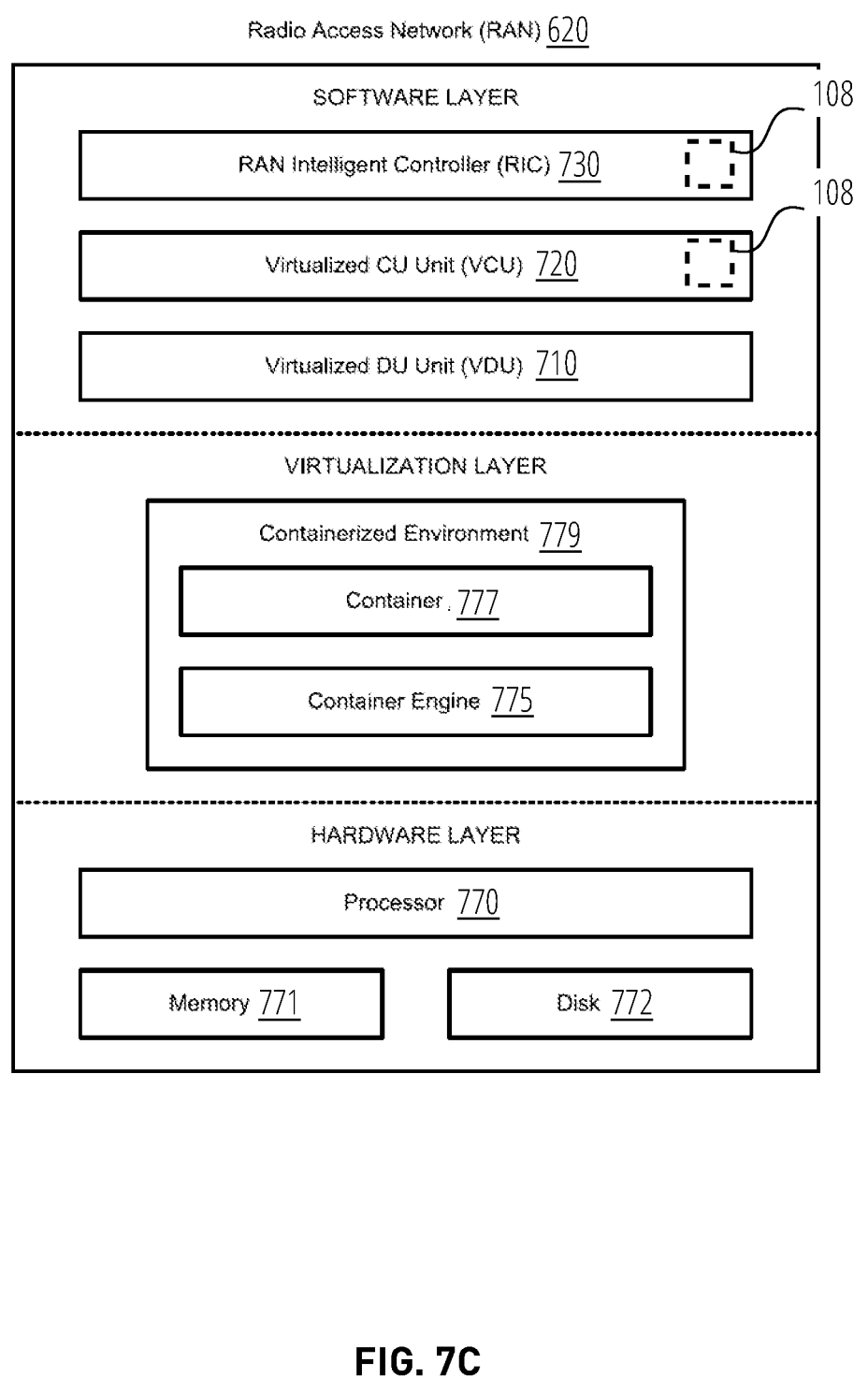

FIG. 7C depicts the RAN 620 of FIG. 7B in which the virtualization layer includes a containerized environment 779 according to at least one embodiment. The containerized environment 779 includes a container engine 775 for instantiating and managing application containers, such as container 777. Containerized applications can include applications that run in isolated runtime environments (or containers). The containerized environment 779 may include a container orchestration service for automating the deployments of containerized applications. The container 777 may be used to deploy microservices for running network functions. The container 777 may run DU components and/or CU components of the RAN 620. The containerized environment 779 may be executed using hardware-level components or executed using processor and storage components of the hardware-level components. In one example, the containerized environment 779 may be run using the processor 770, memory 771, and disk 772. In another example, the containerized environment 779 may be run using a virtual processor and a virtual memory that are themselves executed or generated using the processor 770, memory 771, and disk 772. In at least one embodiment, the pre-scheduling logic 108 can be implemented in the RIC 730 to perform the pre-scheduling operations described herein. In at least one embodiment, the pre-scheduling logic 108 can be implemented in the VCU 720 to perform the pre-scheduling operations described herein.

Figure 7D:
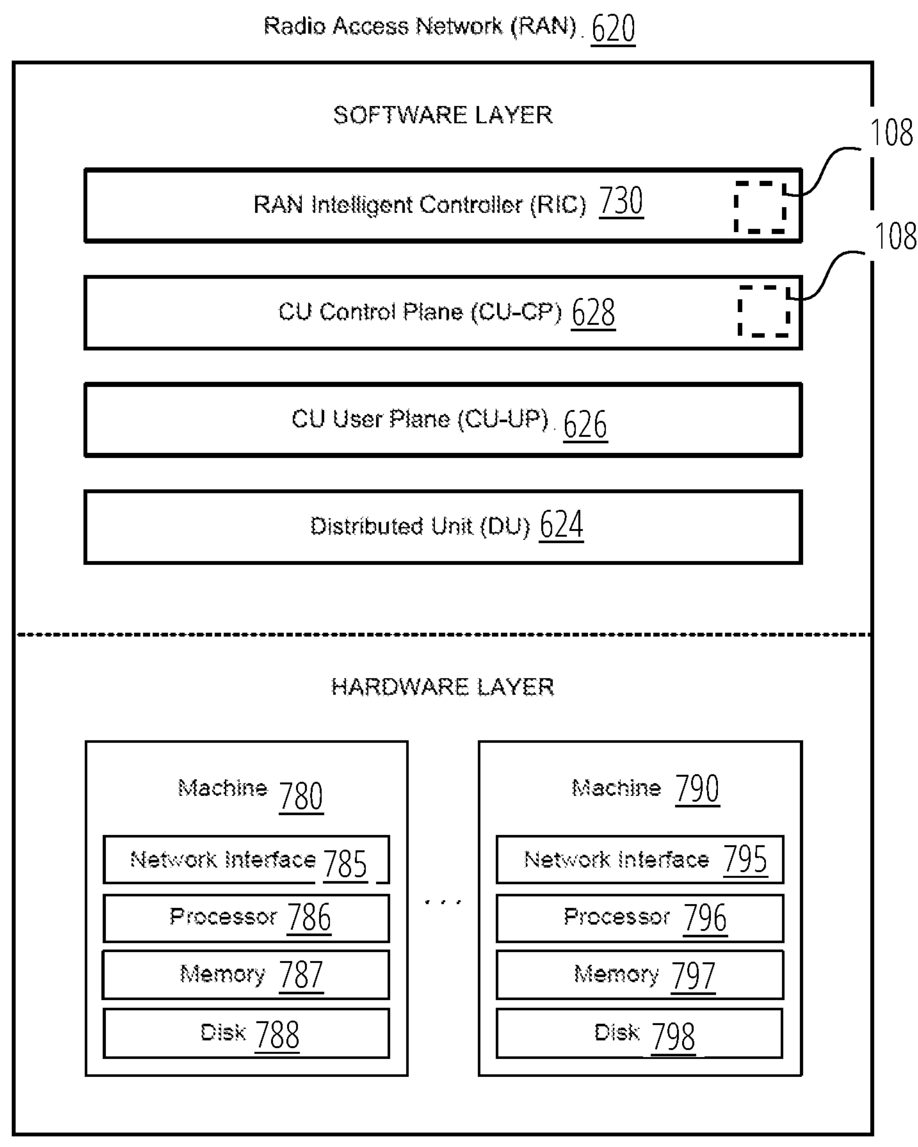

FIG. 7D depicts a RAN 620 according to at least one embodiment. As depicted, the RAN 620 includes hardware-level components and software-level components. The hardware-level components include a set of machines (e.g., physical machines) that may be grouped together and presented as a single computing system or a cluster. Each machine of the set of machines can include a node in a cluster (e.g., a failover cluster).

As depicted, the set of machines includes machine 780 and machine 790. The machine 780 includes a network interface 785, processor 786, memory 787, and disk 788 all in communication with each other. Processor 786 allows machine 780 to execute computer readable instructions stored in memory 787 to perform processes described herein. Processor 786 may include one or more processing units, such as one or more CPUs and/or one or more GPUs. Memory 787 can include one or more types of memory (e.g., RAM, SRAM, DRAM, ROM, EEPROM, or Flash). The disk 788 can include a hard disk drive and/or a solid-state drive. Similarly, the machine 790 includes a network interface 795, processor 796, memory 797, and disk 798 all in communication with each other. Processor 796 allows machine 790 to execute computer readable instructions stored in memory 797 to perform processes described herein. In some embodiments, the set of machines may be used to implement a failover cluster. In some cases, the set of machines may be used to run one or more virtual machines or to execute or generate a containerized environment, such as the containerized environment 779 depicted in FIG. 7C.

The software-level components include a RAN intelligent controller (RIC) 730, CU control plane (CU-CP) 714, CU user plane (CU-UP) 716, and Distributed Unit (DU) 704. In one embodiment, the software-level components may be run using a dedicated hardware server. In another embodiment, the software-level components may be run using a virtual machine running or containerized environment running on the set of machines. In another embodiment, the software-level components may be run from the cloud (e.g., the software-level components may be deployed using a cloud-based compute and storage infrastructure). In at least one embodiment, the pre-scheduling logic 108 can be implemented in the RIC 730 to perform the pre-scheduling operations described herein. In at least one embodiment, the pre-scheduling logic 108 can be implemented in the CU-CP 714 to perform the pre-scheduling operations described herein.

Figure 8A:
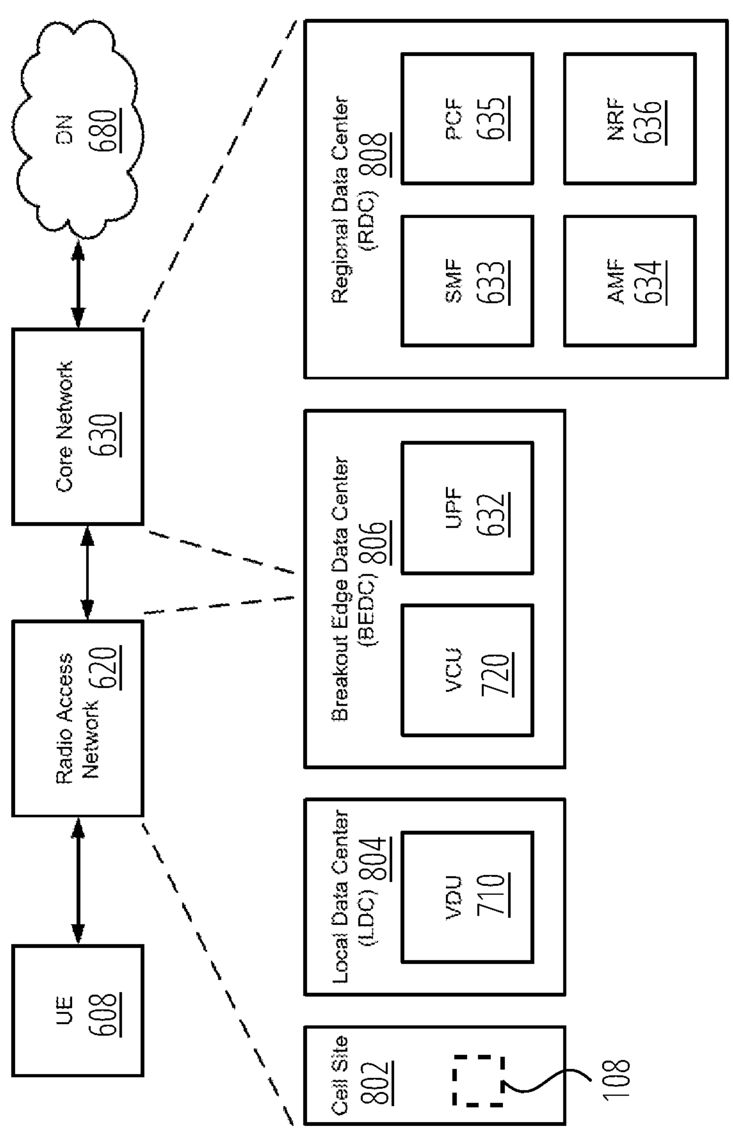
FIG. 8A-FIG. 8D depict various embodiments of a 5G network comprising implementations of a radio access network and a core network with virtualized network functions arranged within a data center hierarchy.

FIG. 8A depicts a 5G network including a RAN 620 and a core network 630 according to at least one embodiment. In at least one embodiment, the pre-scheduling logic 108 can be implemented in the cell site 802 to perform the pre-scheduling operations described herein. In at least one embodiment, the pre-scheduling logic 108 can be implemented in the CU-CP 714 to perform the pre-scheduling operations described herein. The RAN 620 and the core network 630 allow user equipment UE 608 to transfer data to the data network 680 and/or to receive data from the data network 680. As depicted, the VDU 710 and VCU 720 components of the RAN 620 may be implemented using different data centers within a data center hierarchy that includes a local data center (LDC) 804 that is a first electrical distance away from the cell site 802, a breakout edge data center (BEDC) 806 that is a second electrical distance greater than the first electrical distance away from the cell site 802, and a regional data center (RDC) 808 that is a third electrical distance greater than the second electrical distance away from the cell site 802. The local data center (LDC) 804 may correspond with a first one-way latency from the cell site 802. The breakout edge data center (BEDC) 806 may correspond with a second one-way latency greater than the first one-way latency from the cell site 802. The regional data center (RDC) 808 may correspond with a third one-way latency greater than the second one-way latency from the cell site 802. The cell site 802 may include a cell tower or one or more remote radio units (RRUs) for sending and receiving wireless data transmissions. In some cases, the cell site 802 may correspond with a macrocell site or a small cell site, such as a microcell site.

In some cases, a data center may refer to a networked group of computing and storage devices that may run applications and services. The data center may include hardware servers, storage systems, routers, switches, firewalls, application-delivery controllers, cooling systems, and power subsystems. A data center may refer to a collection of computing and storage resources provided by on-premises physical servers and/or virtual networks that support applications and services across pools of physical infrastructure. Within a data center, a set of services may be connected together to provide a computing and storage resource pool upon which virtualized entities may be instantiated. Multiple data centers may be interconnected with each other to form larger networks consisting of pooled computing and storage resources connected to each other by connectivity resources. The connectivity resources may take the form of physical connections, such as Ethernet or optical communications links, and may include wireless communication channels as well. If two different data centers are connected by a set of different communication channels, the links may be combined together using various techniques including the formation of link aggregation groups (LAGs). A LAG can include a logical interface that uses the link aggregation control protocol (LACP) to aggregate multiple connections at a single direct connect endpoint.

As depicted in FIG. 8A, the VDU 710 is running within the local data center (LDC) 804 and the VCU 720 is running within the breakout edge data center (BEDC) 806. The core network functions SMF 633, AMF 634, PCF 635, and NRF 636 are running within the regional data center (RDC) 808. The user plane function UPF 632 is running within the breakout edge data center (BEDC) 806. In some embodiments, the breakout edge data center (BEDC) 806 can include an edge data center at an edge of a network managed by a cloud service provider.

One technical benefit of utilizing edge computing to move network functions closer to user equipment is that data communication latency may be reduced. The reduced latency may enable real-time interactivity between user equipment, such as UE 608 in FIG. 6A, and cloud-based services. Edge computing, including mobile edge computing, may refer to the arrangement of computing and associated storage resources at locations closer to the "edge" of a network in order to reduce data communication latency to and from user equipment (e.g., end user mobile phones). Some technical benefits of positioning edge computing resources closer to UEs include low latency data transmissions (e.g., under 5 ms), real-time (or near real-time) operations, reduced network backhaul traffic, and reduced energy consumption. The edge computing resources may be located within on-premises data centers (on-prem), near or on cell towers, and at network aggregation points within the radio access networks and core networks. Examples of applications and services that may be executed using edge computing include virtual network functions and 5G-enabled network services. The virtual network functions can include software-based network functions that are executed using the edge computing resources.

Technical benefits of dynamically assigning one or more virtualized network functions (e.g., a user plane function) to different locations or servers for execution within a data center hierarchy is that latency, power, and availability requirements may be optimized for multiple network slices over time. Technical benefits of adjusting the server location or the data center location of one or more virtualized network functions (e.g., a user plane function) for a network slice over time is that the network slice may be dynamically reconfigured to adapt to changes in latency, power, and availability requirements. In one example, a network slice may have a first configuration corresponding with a low-latency configuration in which a user plane function is deployed at a cell site and then subsequently be reconfigured to a second configuration corresponding with a low-power configuration in which the user plane function is redeployed at a breakout edge data center location.

The location of the UPF 632 (e.g., whether the UPF 632 is deployed at the local data center 804 or the breakout edge data center 806) places constraints on the transport network not depicted connecting the UPF 632 with the core network 630. For example, depending on the UPF placement location, the transport network for the backhaul (the N3 Interface) may either be minimized if the UPF is placed closer to the VCU 720 (or closer to the RAN edge) or maximized if the UPF is placed farther away from the VCU 720.

The applications and services running on the edge computing resources may communicate with a large number of UEs that may experience connectivity failures (e.g., due to battery life limitations or latency issues) over time. The applications and services may utilize heartbeat tracking techniques to manage device connectivity to the UEs.

Figure 8B:
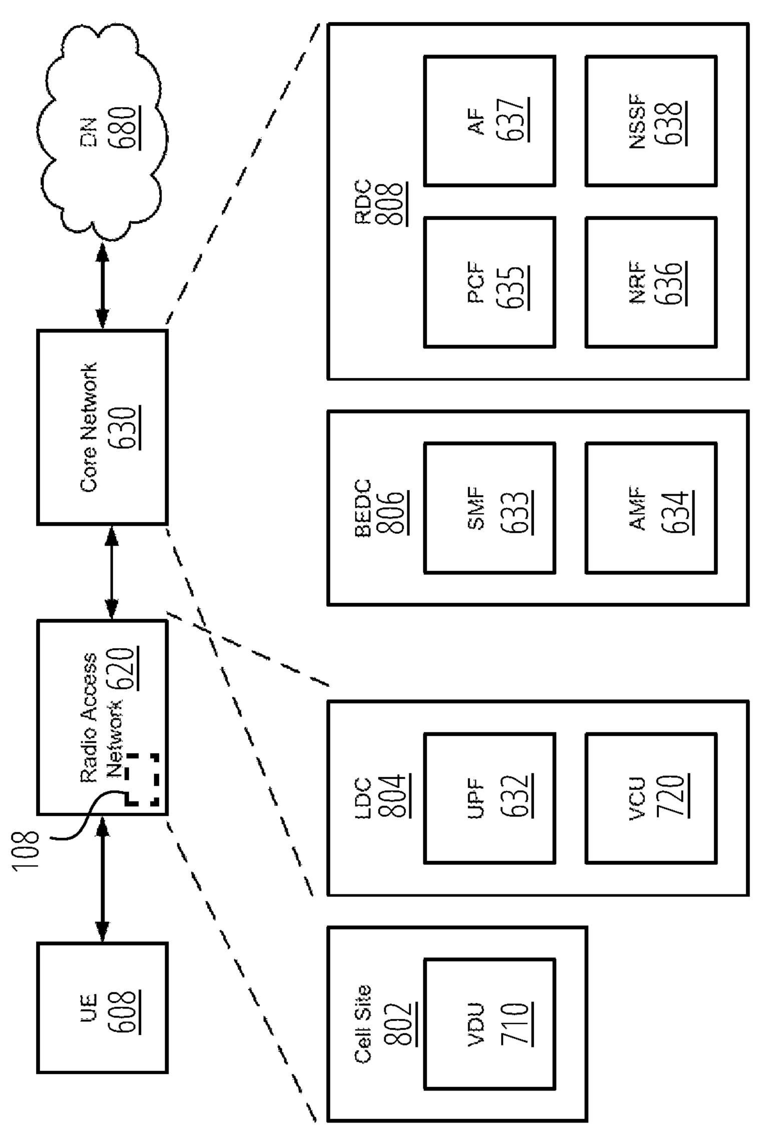

FIG. 8B depicts the 5G network depicted in FIG. 8A in which the VDU 710 has been moved to run at the cell site 802, the VCU 720 and the UPF 632 have been moved to run at the local data center (LDC) 804, and the SMF 633 and the AMF 634 have been moved to run in the breakout edge data center (BEDC) 806 according to at least one embodiment. In at least one embodiment, the pre-scheduling logic 108 can be implemented in the radio access network 620 to perform the pre-scheduling operations described herein. In at least one embodiment, the pre-scheduling logic 108 can be implemented in the CU-CP 714 to perform the pre-scheduling operations described herein. A virtualized network function may be moved from a first data center to a second data center within a data center hierarchy by transferring an application or program code for the virtualized network function from a first server within the first data center to a second server within the second data center. In some embodiments, a second virtual processor that is instantiated and run within the second data center may acquire instructions or program code associated with a virtualized network function prior to a first virtual processor that previously run the virtualized network function within the first data center being deleted. The shifting of network functions closer to the cell site 802 and/or closer to user equipment may have been performed in response to changes in a service level agreement (SLA) or a request to establish a lower-latency network connection from user equipment to a data network. A service level agreement (SLA) may correspond with a service obligation in which penalties may apply if the SLA is violated. In some cases, SLA service metrics may include key performance indicators (KPIs), such as packet loss, latency, and guaranteed bit rate.

In some embodiments, network slices may be reconfigured in order to satisfy traffic isolation requirements, end-to-end latency requirements (e.g., the round-trip time between two end points in a network slice), and throughput requirements for each slice of the network slices. In some cases, the traffic isolation, end-to-end latency, and throughput requirements may vary as a function of a priority level assigned to a given network slice (e.g., whether a network slice have been assigned a high priority or a low priority).

In some embodiments, a first data center and a second data center within a data center hierarchy may both have the same applications or program code stored thereon such that both data centers can run one or more of the same virtualized network functions. In at least one such embodiment, a virtualized network function may be moved from the first data center to the second data center by transferring control or execution of the virtualized network function from the first data center to the second data center without transferring applications or program code.

Figure 8C:
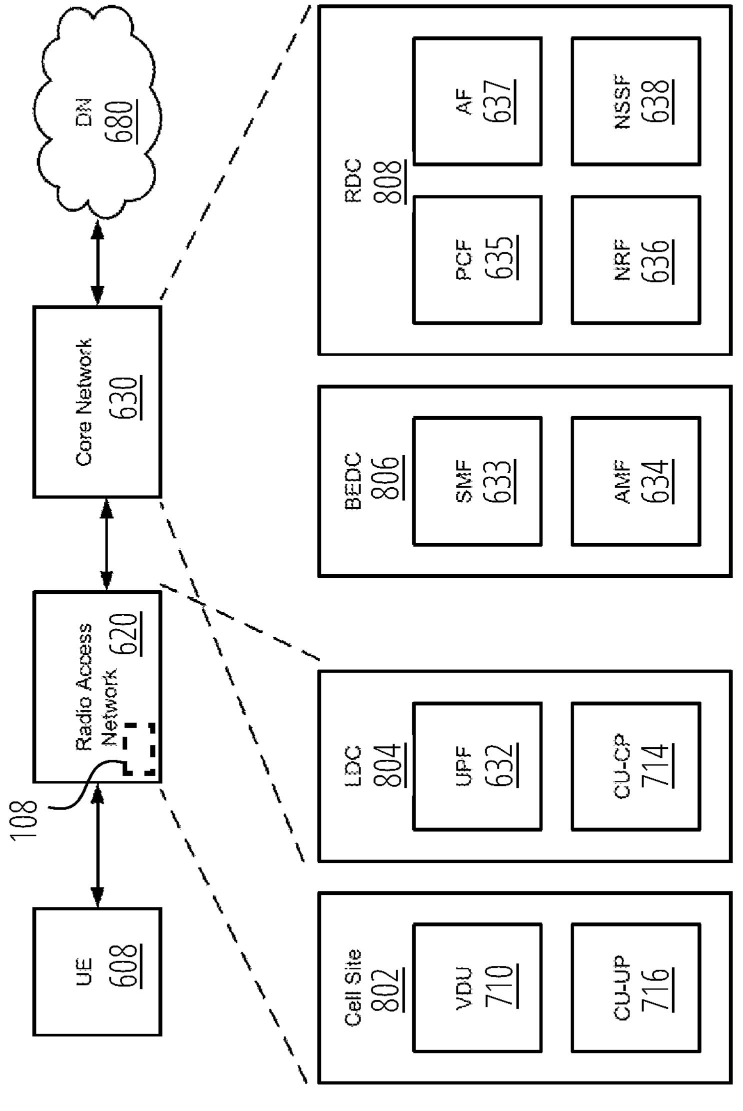

FIG. 8C depicts the 5G network depicted in FIG. 8B in which the VCU 720 has been partitioned such that the CU-CP 714 may run at the local data center (LDC) 804 and the CU-UP 716 may be moved to run at the cell site 802 according to at least one embodiment. The cell site 802 may include computing and storage resources for running containerized applications. n at least one embodiment, the pre-scheduling logic 108 can be implemented in the radio access network 620 to perform the pre-scheduling operations described herein.

Figure 8D:
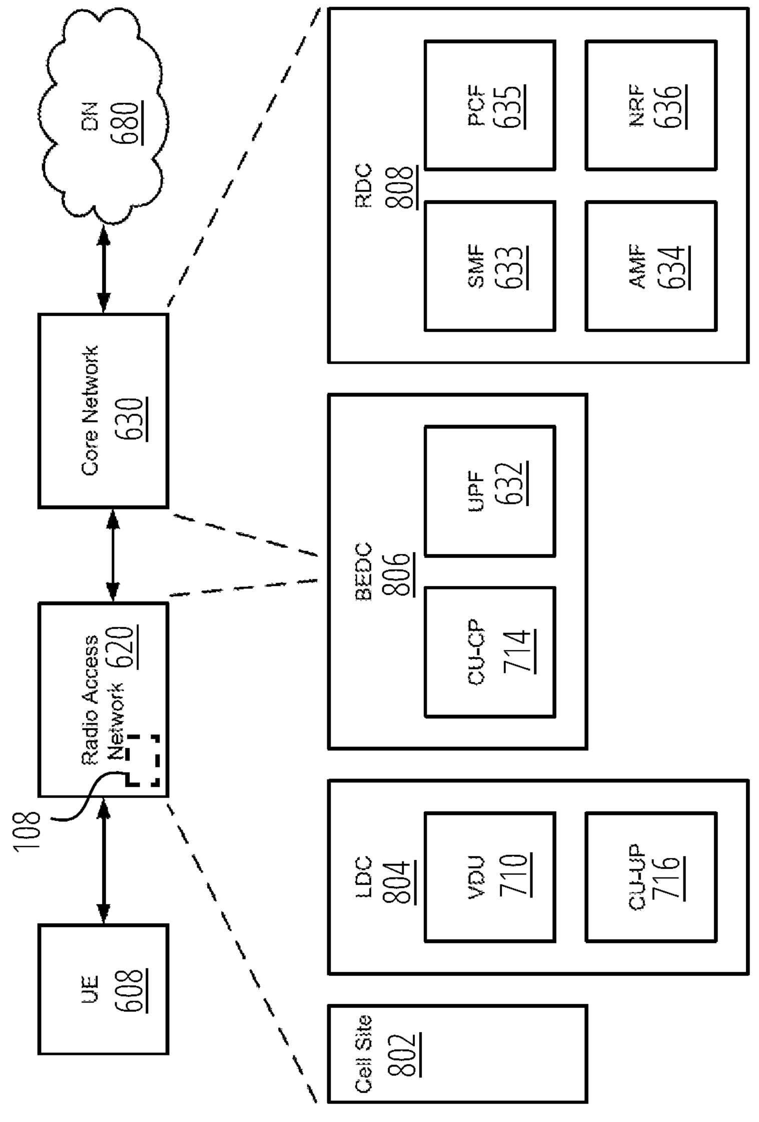

FIG. 8D depicts the 5G network depicted in FIG. 8C in which the CU-CP 714 and the UPF 632 have been moved to run in the breakout edge data center (BEDC) 806, the VDU 710 and the CU-UP 716 have been moved to run at the local data center (LDC) 804, and the SMF 633 and the AMF 634 have been moved to run in the regional data center (RDC) 808 according to at least one embodiment. Deploying the VDU 710 and the CU-UP 716 in the local data center (LDC) 804 may allow the VDU 710 to more efficiently support a number of cells sites including the cell site 802. In at least one embodiment, the pre-scheduling logic 108 can be implemented in the radio access network 620 to perform the pre-scheduling operations described herein.

A data center hierarchy may include a set of data centers that span across different geographic regions. A region may correspond with a large geographical area in which multiple data centers are deployed to provide different cloud services. Each data center within the region may include a server cluster. A server cluster (or cluster) can include a set of physical machines that are connected together via a network. The cluster may be used to process and store data and to run applications and services in a distributed manner. Applications and data associated with the applications may be replicated or mirrored over a set of machines within a cluster to improve fault tolerance. Each machine in a cluster can include a node in the cluster. In at least one example, the cluster can include a failover cluster.

Geo-redundancy may be achieved by running applications or services across two or more availability zones within the same region. Geo-redundancy may refer to the physical placement of servers or server clusters within geographically diverse data centers to safeguard against catastrophic events and natural disasters.

An availability zone can include a smaller geographical area that is smaller than the large geographical area of the region. Multiple availability zones may reside within a region. An availability zone can include one or more data centers with redundant power, networking, and connectivity within a region.

Each region can include a separate geographical area that does not overlap with any other regions. A logical grouping of one or more data centers within a region may correspond with an availability zone. Each region may include multiple availability zones that can include multiple isolated geographical areas within the region. The data centers within the availability zones of a region may be physically isolated from each other inside the region to improve fault tolerance.

Each availability zone inside a geographical region may utilize its own power, cooling, and networking connections. An application may be deployed across two or more availability zones in order to ensure high availability. In this case, if a first availability zone goes down (e.g., due to a power failure) within a geographical region, then the application may still be accessible and running within a second availability zone. Each availability zone within the geographical region may be connected to each other with high bandwidth, low latency network connections to enable synchronous replication of applications and services across the two or more availability zones.

A local zone may correspond with a small geographical region in which one or more data centers are deployed to provide low latency (e.g., single-digit millisecond latency) applications and services. User equipment that is located within the small geographical region or that is located within a threshold distance (e.g., within two miles) of the small geographical region may be able to provide low latency services. A data center within a local zone may allow a direct private connection to compute and storage resources without requiring access to the Internet. The direct private connection may utilize fiber optic cables to allow a server within the local zone to privately connect to other data centers without requiring access to the Internet.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions. One or more non-transitory, computer-readable storage media can have computer-readable instructions stored thereon which, when executed by one or more processing devices, cause the one or more processing devices to perform the operations described herein.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of operating a node of a cellular network, the method comprising:

receiving, from a user equipment (UE), a first message comprising a random access channel (RACH) preamble;

sending, to the UE, a second message comprising a random access response (RAR) with a first grant for the UE to send a third message;

receiving, from the UE, the third message comprising a radio resource control (RRC) message associated with the first grant;

determining, using one or more parameters indicative of a latency for scheduling resource blocks by the node, that one or more scheduled resource blocks (SRBs) be pre-allocated to the UE before receiving a scheduling request (SR) from the UE; and sending, to the UE, a fourth message comprising a second grant identifying the one or more SRBs pre-allocated to the UE.

2. The method of claim 1, wherein the RRC message comprises an RRC setup request, wherein determining that the one or more SRBs be pre-allocated to the UE reduces an overall latency of allocating the one or more SRBs to the UE, in response to the RRC setup request, from a first amount of time to a second amount of time, wherein:

the first amount of time comprises at least one of a first processing time for the node to process the third message and send an RRC setup response to the UE, a second processing time for the UE to process the RRC setup response and send the SR to the node on a physical uplink control channel (PUCCH), a third processing time for the node to process the SR and send a resource allocation response to the SR, or a fourth processing time for the UE to send an RRC setup complete message to the node; and the second amount of time only comprises a fifth processing time for the node to process the third message and send the fourth message to the UE.

3. The method of claim 1, wherein the one or more parameters comprise at least one of:

a first parameter representing a cell level load of the node;

a number of UEs connected to the node;

a second parameter representing an amount of processing time for the node to process the RRC message; or a third parameter representing a traffic demand of the node.

4. The method of claim 1, further comprising determining, using the one or more parameters, a grant size for the second grant, wherein the second grant identifies the grant size.

5. The method of claim 1, wherein the one or more parameters comprises a receive signal strength indicator (RSSI) associated with the UE, and wherein the method further comprises determining, using the RSSI, a number of segments for the RRC message, wherein the second grant identifies the number of segments.

6. The method of claim 1, wherein the RRC message comprises an RRC reconfiguration request, wherein determining that the one or more SRBs be pre-allocated to the UE reduces an overall latency of allocating the one or more SRBs to the UE, in response to the RRC reconfiguration request, from a first amount of time to a second amount of time, wherein:

the first amount of time comprises at least one of a first processing time for the node to process the third message and send an RRC reconfiguration response to the UE, a second processing time for the UE to process the RRC reconfiguration response and send the SR to the node on a physical uplink control channel (PUCCH), a third processing time for the node to process the SR and send a resource allocation response to the SR, or a fourth processing time for the UE to send an RRC reconfiguration complete message to the node; and the second amount of time only comprises a fifth processing time for the node to process the third message and send the fourth message to the UE.

7. The method of claim 1, wherein the cellular network is a 5G wireless network.

8. A computing system of a node of a cellular network, the computing system comprising:

one or more processing devices; and memory communicatively coupled with and readable by the one or more processing devices and having stored therein processor-readable instructions which, when executed by the one or more processing devices, cause the one or more processing devices to perform operations comprising:

receiving, from a user equipment (UE), a first message comprising a random access channel (RACH) preamble;

sending, to the UE, a second message comprising a random access response (RAR) with a first grant for the UE to send a third message;

receiving, from the UE, the third message comprising a radio resource control (RRC) message associated with the first grant;

determining, using one or more parameters indicative of a latency for scheduling resource blocks by the node, that one or more scheduled resource blocks (SRBs) be pre-allocated to the UE before receiving a scheduling request (SR) from the UE; and sending, to the UE, a fourth message comprising a second grant identifying the one or more SRBs pre-allocated to the UE.

9. The computing system of claim 8, wherein the RRC message comprises an RRC setup request, wherein determining that the one or more SRBs be pre-allocated to the UE reduces an overall latency of allocating the one or more SRBs to the UE, in response to the RRC setup request, from a first amount of time to a second amount of time, wherein:

the first amount of time comprises at least one of a first processing time for the node to process the third message and send an RRC setup response to the UE, a second processing time for the UE to process the RRC setup response and send the SR to the node on a physical uplink control channel (PUCCH), a third processing time for the node to process the SR and send a resource allocation response to the SR, or a fourth processing time for the UE to send an RRC setup complete message to the node; and the second amount of time only comprises a fifth processing time for the node to process the third message and send the fourth message to the UE.

10. The computing system of claim 8, wherein the one or more parameters comprise at least one of:

a first parameter representing a cell level load of the node;

a number of UEs connected to the node;

a second parameter representing an amount of processing time for the node to process the RRC message; or a third parameter representing a traffic demand of the node.

11. The computing system of claim 8, wherein the operations further comprise determining, using the one or more parameters, a grant size for the second grant, wherein the second grant identifies the grant size.

12. The computing system of claim 8, wherein the one or more parameters comprises a receive signal strength indicator (RSSI) associated with the UE, and wherein the operations further comprise determining, using the RSSI, a number of segments for the RRC message, wherein the second grant identifies the number of segments.

13. The computing system of claim 8, wherein the RRC message comprises an RRC reconfiguration request, wherein determining that the one or more SRBs be pre-allocated to the UE reduces an overall latency of allocating the one or more SRBs to the UE, in response to the RRC reconfiguration request, from a first amount of time to a second amount of time, wherein:

the first amount of time comprises at least one of a first processing time for the node to process the third message and send an RRC reconfiguration response to the UE, a second processing time for the UE to process the RRC reconfiguration response and send the SR to the node on a physical uplink control channel (PUCCH), a third processing time for the node to process the SR and send a resource allocation response to the SR, or a fourth processing time for the UE to send an RRC reconfiguration complete message to the node; and the second amount of time only comprises a fifth processing time for the node to process the third message and send the fourth message to the UE.

14. The computing system of claim 8, wherein the cellular network is a 5G wireless network.

15. One or more non-transitory, computer-readable storage media having computer-readable instructions thereon which, when executed by one or more processing devices, cause the one or more processing devices to perform operations of a node comprising:

receiving, from a user equipment (UE), a first message comprising a random access channel (RACH) preamble;

sending, to the UE, a second message comprising a random access response (RAR) with a first grant for the UE to send a third message;

receiving, from the UE, the third message comprising a radio resource control (RRC) message associated with the first grant;

determining, using one or more parameters indicative of a latency for scheduling resource blocks by the node, that one or more scheduled resource blocks (SRBs) be pre-allocated to the UE before receiving a scheduling request (SR) from the UE; and sending, to the UE, a fourth message comprising a second grant identifying the one or more SRBs pre-allocated to the UE.

16. The one or more non-transitory, computer-readable storage media of claim 15, wherein the RRC message comprises an RRC setup request, wherein determining that the one or more SRBs be pre-allocated to the UE reduces an overall latency of allocating the one or more SRBs to the UE, in response to the RRC setup request, from a first amount of time to a second amount of time, wherein:

the first amount of time comprises at least one of a first processing time for the node to process the third message and send an RRC setup response to the UE, a second processing time for the UE to process the RRC setup response and send the SR to the node on a physical uplink control channel (PUCCH), a third processing time for the node to process the SR and send a resource allocation response to the SR, or a fourth processing time for the UE to send an RRC setup complete message to the node; and the second amount of time only comprises a fifth processing time for the node to process the third message and send the fourth message to the UE.

17. The one or more non-transitory, computer-readable storage media of claim 15, wherein the one or more parameters comprise at least one of:

a first parameter representing a cell level load of the node;

a number of UEs connected to the node;

a second parameter representing an amount of processing time for the node to process the RRC message; or a third parameter representing a traffic demand of the node.

18. The one or more non-transitory, computer-readable storage media of claim 15, wherein the operations further comprise determining, using the one or more parameters, a grant size for the second grant, wherein the second grant identifies the grant size.

19. The one or more non-transitory, computer-readable storage media of claim 15, wherein the one or more parameters comprises a receive signal strength indicator (RSSI) associated with the UE, and wherein the operations further comprise determining, using the RSSI, a number of segments for the RRC message, wherein the second grant identifies the number of segments.

20. The one or more non-transitory, computer-readable storage media of claim 15, wherein the RRC message comprises an RRC reconfiguration request, wherein determining that the one or more SRBs be pre-allocated to the UE reduces an overall latency of allocating the one or more SRBs to the UE, in response to the RRC reconfiguration request, from a first amount of time to a second amount of time, wherein:

the first amount of time comprises at least one of a first processing time for the node to process the third message and send an RRC reconfiguration response to the UE, a second processing time for the UE to process the RRC reconfiguration response and send the SR to the node on a physical uplink control channel (PUCCH), a third processing time for the node to process the SR and send a resource allocation response to the SR, or a fourth processing time for the UE to send an RRC reconfiguration complete message to the node; and the second amount of time only comprises a fifth processing time for the node to process the third message and send the fourth message to the UE.

* * * * *